US011911702B2

(12) United States Patent
Lai

(10) Patent No.: US 11,911,702 B2
(45) Date of Patent: Feb. 27, 2024

(54) AI PARAMETER CONFIGURATION METHOD AND APPARATUS FOR RACING AI MODEL, AI PARAMETER CONFIGURATION DEVICE, AND STORAGE MEDIUM

(71) Applicant: TENCENT TECHNOLOGY (SHENZHEN) COMPANY LIMITED, Shenzhen (CN)

(72) Inventor: Guixiong Lai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 931 days.

(21) Appl. No.: 16/899,243

(22) Filed: Jun. 11, 2020

(65) Prior Publication Data
US 2020/0298130 A1    Sep. 24, 2020

Related U.S. Application Data

(63) Continuation of application No. PCT/CN2019/078834, filed on Mar. 20, 2019.

(30) Foreign Application Priority Data

Mar. 30, 2018 (CN) .......................... 201810299375.0

(51) Int. Cl.
*A63F 13/803* (2014.01)
*A63F 13/67* (2014.01)
(Continued)

(52) U.S. Cl.
CPC ............ *A63F 13/803* (2014.09); *A63F 13/67* (2014.09); *A63F 13/795* (2014.09); *G06N 3/126* (2013.01)

(58) Field of Classification Search
CPC ..................................................... G06N 3/126
See application file for complete search history.

(56) References Cited

U.S. PATENT DOCUMENTS 10,346,743 B2 * 7/2019 Cantin .................. G06N 20/00
2011/0137629 A1   6/2011 Tipping et al.

FOREIGN PATENT DOCUMENTS

CN       102291308 A    12/2011
CN       104239434 A    12/2014
(Continued)

OTHER PUBLICATIONS

Cardamone, Luigi, et al. "Searching for the optimal racing line using genetic algorithms." Proceedings of the 2010 IEEE Conference on Computational Intelligence and Games. IEEE, 2010. (Year: 2010).*

(Continued)

*Primary Examiner* — Eric Nilsson
(74) *Attorney, Agent, or Firm* — ARENTFOX SCHIFF LLP

(57) ABSTRACT

An artificial intelligence (AI) parameter configuration method for a racing AI model performed by an AI parameter configuration device is provided. A first parameter set including m sets of AI parameters is obtained. Each of the m sets of AI parameters is used by the racing AI model to travel on a track. The racing AI model is controlled to undergo an adaptation degree test according to each of the m sets of AI parameters to obtain m adaptation degrees. The m adaptation degrees are positively correlated with travel distances of the racing AI model on the track according to the m sets of AI parameters. A second parameter set is generated according to the first parameter set in a case that all the m adaptation degrees are less than an adaptation degree threshold. In a case that a target adaptation degree in the m adaptation degrees is greater than the adaptation
(Continued)

degree threshold, an AI parameter corresponding to the target adaptation degree is configured as a target AI parameter.

20 Claims, 9 Drawing Sheets

(51) Int. Cl.
*A63F 13/795* (2014.01)
*G06N 3/126* (2023.01)

(56) References Cited

FOREIGN PATENT DOCUMENTS

| CN | 104572993 A | 4/2015 |
|---|---|---|
| CN | 106293963 A | 1/2017 |
| CN | 107694094 A | 2/2018 |
| CN | 108465244 A | 8/2018 |
| JP | 2013-058095 A | 3/2013 |
| JP | 5909946 B2 | 4/2016 |

OTHER PUBLICATIONS

Munoz, Jorge, German Gutierrez, and Araceli Sanchis. "Multi-objective evolution for car setup optimization." 2010 UK Workshop on Computational Intelligence (UKCI). IEEE, 2010. (Year: 2010).*

International Search Report Issued in Application PCT/CN2019/078834 dated Jun. 14, 2019, with English Translation (7 pages).

Written Opinion Issued in Application PCT/CN2019/078834 dated Jun. 14, 2019 (4 pages).

Extended European Search Report dated Feb. 4, 2021 in Application No. 19774957.5, (13 pages).

Luigi Cardaomone et al., "Searching for the Optimal Racing Line Using Genetic Algorithms," 2010 IEEE Symposium on Computational Intelligence and Games (CIG), Piscataway, NJ, Aug. 18, 2010 (7 pages).

Matteo Botta et al., "Evolving the Optimal Racing Line in a High-End Racing Game," 2012 IEEE Conference on Computational Intelligence and Games (CIG), Sep. 11, 2012 (8 pages).

The Mathworks et al., "How the Genetic Algorithm Works—MATLAB & Simulink," 3 Marc 2016 (3 pages).

Marc Ebner et al., "Evolving Driving Controllers using Genetic Programming," 2009 IEEE Symposium on Computational Intelligence and Games (CIG), Piscataway, NJ, Sep. 7, 2009 (8 pages).

Bruno Macedo et al., "Evolving Finite-State Machines Controllers forthe Simulated Car Racing Championship," 2015 14th Brazilian Symposium on Computer Games and Digital Entertainment, Nov. 11, 2015 (13 pages).

Alexandros Agapitos et al., "Evolving Controllers for Simulated Car Racing using Object Oriented Genetic Programming," Genetic and Evolutionary Computation, Jul. 7, 2007 (8 pages).

Julian Togelius et al., "Evolving Controllers for Simulated Car Racing," 2005 IEEE Congress on Evolutionary Computation, Edinburgh, Scotland, UK, Sep. 2, 2005 (8 pages).

Mohammed Salem et al., "Evolving a TORCS Modular Fuzzy Driver Using Genetic Algorithms," Big Data Analytics in the Social and Ubiquitous Context: 5th International Workshop on Modeling Social Media, Mar. 8, 2018 (16 pages).

* cited by examiner

AI PARAMETER CONFIGURATION METHOD AND APPARATUS FOR RACING AI MODEL, AI PARAMETER CONFIGURATION DEVICE, AND STORAGE MEDIUM

RELATED APPLICATION

This application is a continuation of International Application No. PCT/CN2019/078834, filed on Mar. 20, 2019, which claims priority to Chinese Patent Application No. 201810299375.0, entitled "AI PARAMETER CONFIGURATION METHOD AND APPARATUS FOR RACING AI MODEL, AI PARAMETER CONFIGURATION DEVICE, AND STORAGE MEDIUM" filed on Mar. 30, 2018. The entire disclosures of the prior applications are hereby incorporated by reference in their entirety.

FIELD OF THE TECHNOLOGY

Embodiments of this application relate to the field of artificial intelligence (AI), such as an AI parameter configuration for a racing AI model.

BACKGROUND OF THE DISCLOSURE

In racing game applications, a race car AI needs to be introduced into a large quantity of game scenes. For example, it is necessary to introduce several race car AI models to race against real players in a case of standalone mode or insufficient player matching.

To enable the race car AI to achieve a more real simulation effect, a developer needs to configure a set of AI parameters for a race car AI model after developing the race car AI model. In an AI parameter configuration manner, the developer initiates a set of AI parameters, and instructs the race car AI model to travel on a track according to the AI parameters; and the developer adjusts the AI parameters by viewing and analyzing a travel effect of the race car AI model, so as to finally obtain AI parameters that meet the expectation of the developer after repeated simulation and AI parameter adjustment.

When the AI parameters are configured by using the foregoing manner, a set of AI parameters includes a large quantity of parameters, and the parameters are coupled to each other. Consequently, a large quantity of time needs to be consumed to manually adjust the AI parameters, resulting in relatively low efficiency of AI parameter configuration.

SUMMARY

Embodiments of this application provide an AI parameter configuration method and apparatus for a racing AI model, an AI parameter configuration device, and a non-transitory computer-readable storage medium, for example to resolve a problem in the related art that a large quantity of time needs to be consumed to manually adjust AI parameters, resulting in relatively low efficiency of AI parameter configuration.

According to a first aspect, an artificial intelligence (AI) parameter configuration method for a racing AI model performed by an AI parameter configuration device is provided. A first parameter set including m sets of AI parameters is obtained. Each of the m sets of AI parameters is used by the racing AI model to travel on a track. The racing AI model is controlled to undergo an adaptation degree test according to each of the m sets of AI parameters to obtain m adaptation degrees. The m adaptation degrees are positively correlated with travel distances of the racing AI model on the track according to the m sets of AI parameters. A second parameter set is generated according to the first parameter set in a case that all the m adaptation degrees are less than an adaptation degree threshold. In a case that a target adaptation degree in the m adaptation degrees is greater than the adaptation degree threshold, an AI parameter corresponding to the target adaptation degree is configured as a target AI parameter.

According to a second aspect, an artificial intelligence (AI) parameter configuration apparatus for a racing AI model is provided. The apparatus includes processing circuitry configured to obtain a first parameter set including m sets of AI parameters. Each of them sets of AI parameters is used by the racing AI model to travel on a track. The racing AI model is controlled to undergo an adaptation degree test according to each of the m sets of AI parameters to obtain m adaptation degrees. The m adaptation degrees are positively correlated with travel distances of the racing AI model on the track according to the m sets of AI parameters. A second parameter set is generated according to the first parameter set in a case that all the m adaptation degrees are less than an adaptation degree threshold. In a case that a target adaptation degree in the m adaptation degrees is greater than the adaptation degree threshold, an AI parameter corresponding to the target adaptation degree is configured as a target AI parameter.

According to a third aspect, an AI parameter configuration device is provided, the device including a processor and a memory, the memory storing at least one instruction, at least one section of program, a code set, or an instruction set, and the at least one instruction, the at least one section of program, the code set, or the instruction set being executed by the processor to implement the AI parameter configuration method for a racing AI model according to the first aspect.

According to a fourth aspect, a computer-readable storage medium is provided, the storage medium storing at least one instruction, at least one section of program, a code set, or an instruction set, and the at least one instruction, the at least one section of program, the code set, or the instruction set being executed by a processor to implement the AI parameter configuration method for a racing AI model according to the first aspect. For example, a non-transitory computer-readable storage medium storing instructions which when executed by a processor cause the processor to perform an artificial intelligence (AI) parameter configuration method for a racing AI model is provided. A first parameter set including m sets of AI parameters is obtained. Each of the m sets of AI parameters is used by the racing AI model to travel on a track. The racing AI model is controlled to undergo an adaptation degree test according to each of the m sets of AI parameters to obtain m adaptation degrees. The m adaptation degrees are positively correlated with travel distances of the racing AI model on the track according to the m sets of AI parameters. A second parameter set is generated according to the first parameter set in a case that all the m adaptation degrees are less than an adaptation degree threshold. In a case that a target adaptation degree in the m adaptation degrees is greater than the adaptation degree threshold, an AI parameter corresponding to the target adaptation degree is configured as a target AI parameter.

Beneficial effects of the technical solutions provided in the embodiments of this application include the $n^{th}$ generation of parameter set including the m sets of AI parameters is obtained, and the race car AI model is controlled to undergo the adaptation degree test for m times according to the m sets of AI parameters, so that the $(n+1)^{th}$ generation of parameter set is generated according to the $n^{th}$ generation of parameter set in a case that the m adaptation degrees obtained through the test are all less than the adaptation degree threshold, and a next round of adaptation degree test is performed; and a target AI parameter is configured according to the AI parameter corresponding to the target adaptation degree in a case that the target adaptation degree in the m adaptation degrees obtained through the test is greater than the adaptation degree threshold. Compared with adjusting the AI parameters manually, the AI parameters are automatically adjusted by using a genetic algorithm, thereby improving the efficiency of adjusting and configuring the AI parameters; and a parameter coverage rate is higher when the genetic algorithm is used for adjusting the AI parameters, thereby facilitating improvement in the quality of the AI parameters.

BRIEF DESCRIPTION OF THE DRAWINGS

To describe the technical solutions in the embodiments of this application more clearly, the accompanying drawings required for describing the embodiments are briefly described below. The accompanying drawings in the following description show exemplary embodiments of this application, and a person of ordinary skill in the art may obtain other accompanying drawings from the accompanying drawings.

DESCRIPTION OF EMBODIMENTS

Figure 1:
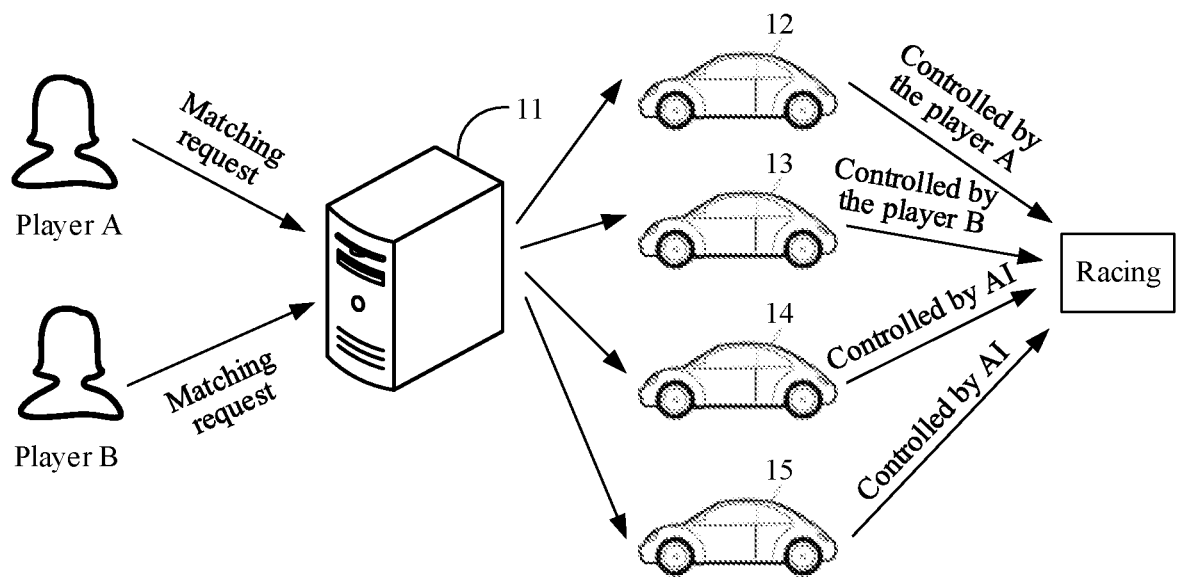
FIG. 1 is a schematic implementation diagram of a procedure in which a server matches game AI according to an embodiment of this application.

To make objectives, technical solutions, and advantages of this application clearer, the following further describes in detail implementations of this application with reference to the accompanying drawings.

To facilitate understanding, the following explains terms involved in the embodiments of this application.

AI parameters: A series of parameters used for instructing an AI model to perform designated operations. In the embodiments of this application, the AI parameters are parameters used for instructing a race car AI model to travel on a designated track. In other application scenarios, the AI parameters may be further parameters used for instructing other AI models such as a vehicle AI model or a three-dimensional human body AI model to travel to a designated position or to perform a designated action.

Adaptation degree: In the field of genetics, the adaptation degree refers to a degree of adaptation of a living body to an environment. However, in the embodiments of this application, the adaptation degree refers to a travel distance of the AI model (e.g., race car AI model) on the designated track according to the AI parameters, where a higher adaptation degree of the AI parameters indicates a longer travel distance of the AI model on the track according to the AI parameters; otherwise, indicates a shorter travel distance of the AI model on the track.

Parent AI parameter: In the field of genetics, a parent refers to a living body that gives birth to a next generation. However, in the embodiments of this application, the parent AI parameter refers to a set of AI parameters used for generating a next generation of AI parameters, and the next generation of AI parameters generated by the parent AI parameter are referred to as child AI parameters.

Crossover: In the field of genetics, one part of genes of a child comes from the father, the other part comes from the mother, and crossover represents such a genetic inheritance procedure. In the embodiments of this application, the crossover refers to a procedure in which some AI parameters in two sets of parent AI parameters are replaced with each other to generate two sets of child AI parameters. Some AI parameters in each set of child AI parameters are from one set of the parent AI parameters, and the remaining AI parameters are from the other set of parent AI parameter.

Mutation: In the field of genetics, the mutation refers to a phenomenon that a gene in a living body is changed due to being affected by factors such as an environment, to generate a gene different from genes of a last generation, and appropriate mutation is conducive to improving genetic diversity. In the embodiments of this application, the mutation means that a parameter in the child AI parameters is changed, to generate a parameter different from the parent AI parameters. A probability of the mutation of the AI parameter is related to a preset mutation probability.

Catastrophe: In the field of genetics, the catastrophe refers to an unpredictable disaster change that occurs in a population of living bodies. In the embodiments of this application, the catastrophe is divided as a small catastrophe and a big catastrophe. The small catastrophe means that an AI parameter with a maximum adaptation degree is removed, and the big catastrophe means that a mutation probability of each set of AI parameters in the parameter set is improved greatly. It is beneficial to resolve a problem of a local optimal solution and to achieve a global optimal solution by performing catastrophe handling on the parameter set properly.

In a racing game application, when a player requests to match with other players (e.g., by running a terminal in which the racing game application is installed), but a quantity of real players that can be found through matching is not sufficient, a game server runs a designated race car AI model (or other racing vehicle AI model) on a terminal used by a real player, so that a race car (or other vehicle) controlled by the real player can race against the race car AI model controlled by AI (i.e., adding AI to a game). As shown in FIG. 1, when a player A and a player B initiate matching requests to a game server 11, a quantity of the matching requests received by the game server 11 is less than a minimum request quantity of 4, so that the game server 11 instructs a terminal used by the player A to control a race car 12, instructs a terminal used by the player B to control a race car 13, and further instructs the terminal used by the player A or the player B to control AI race cars 14 and 15, so as to ensure that there are four race cars racing in the same game.

To enable an AI race car to simulate an effect of manual control more readily, a developer needs to configure a set of AI parameters for the race car AI model in advance, so that the race car AI model travels on a track according to the AI parameters. An AI parameter configuration method provided in the embodiments of this application is applied to an adjustment and configuration stage of AI parameters.

The AI parameter configuration method provided in the embodiments of this application is performed by an AI parameter configuration device, and the device may be a desktop computer, a personal portable computer, or a server. In a possible implementation, the AI parameter configuration device is a backend server of the racing game application. Before the racing game application is launched, the server adjusts and configures different AI parameters for different tracks by using a genetic algorithm, so that the race car AI model travels on a track according to corresponding AI parameters.

In the related art, to configure a set of AI parameters with high quality, the developer needs to repeat a procedure of "adjusting the AI parameters→viewing an analysis result-→adjusting the AI parameters", and a large quantity of manpower and time need to be consumed when a relatively large quantity of AI parameters are involved; moreover, an insufficient coverage rate during manual adjustment and configuration of AI parameters results in a poor effect of travelling of the race car AI model on the track according to the final configuration of AI parameters, that is, the AI parameters with high quality cannot be configured (e.g., unable to play against high level players).

Figure 2:
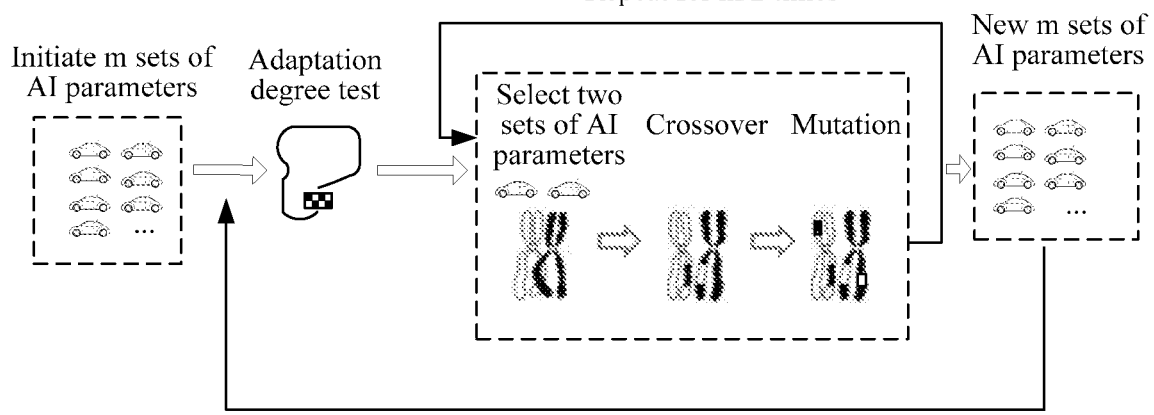
FIG. 2 is a schematic flowchart of an AI parameter configuration method according to an embodiment of this application.

However, in the embodiments of this application, the AI parameters are automatically adjusted and configured by using the AI parameter configuration method based on the genetic algorithm. As shown in FIG. 2, after the m sets of AI parameters are initiated, the AI parameter configuration device automatically performs the adaptation degree test for m times according to the AI parameters, selects two sets of AI parameters as the parent AI parameters in a case that the adaptation degrees of the AI parameters have not reached a target, and performs crossover and mutation on the parent AI parameters to generate two sets of child AI parameters. After repeatedly performing the foregoing operations for m/2 times, the AI parameter configuration device generates new m sets of AI parameters. The AI parameter configuration device performs the foregoing operations iteratively, until AI parameters whose adaptation degree conforms to the target are obtained. A schematic embodiment is provided below for description.

Figure 3:
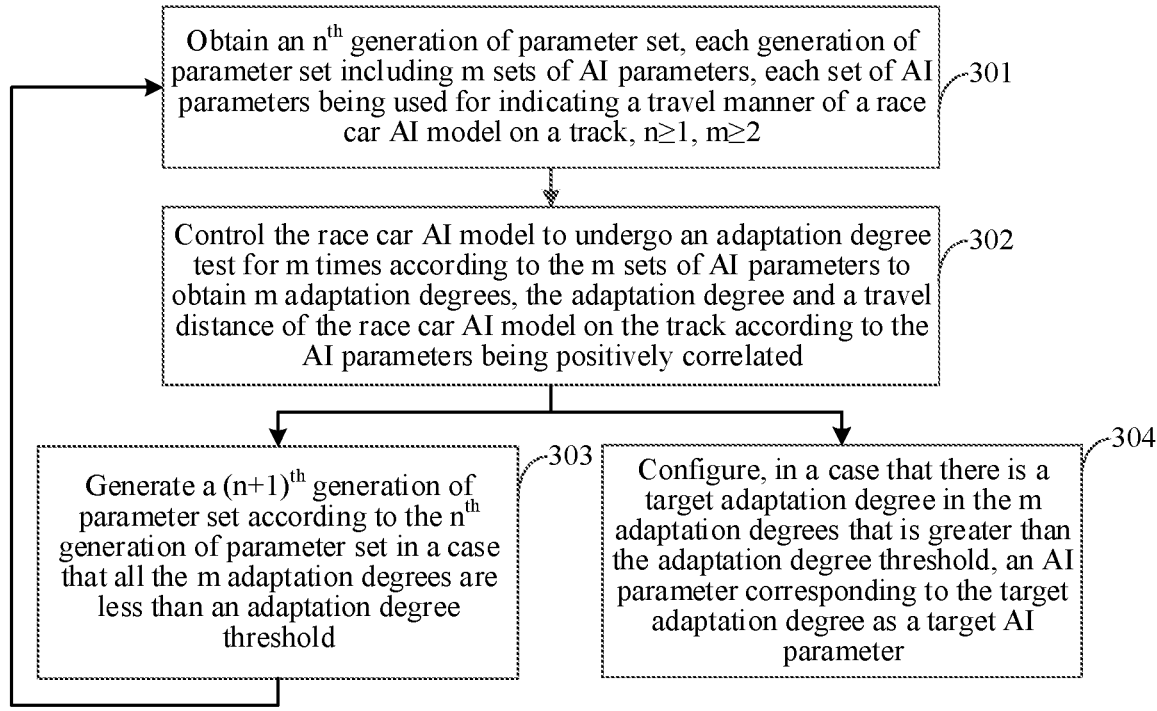
FIG. 3 is a flowchart of an AI parameter configuration method according to an embodiment of this application.

FIG. 3 is a flowchart of an AI parameter configuration method according to an embodiment of this application. This embodiment uses an example in which the AI parameter configuration method is applied to an AI parameter configuration device for description, and the method may include the following steps.

In step 301, an $n^{th}$ generation of parameter set (e.g., first parameter set) is obtained, each generation of parameter set including m sets of AI parameters, each set of AI parameters being used for indicating a travel manner of a race car AI model on a track, $n \geq 1$, $m \geq 2$. For example, a first parameter set including m sets of AI parameters is obtained, each of the m sets of AI parameters being used by a racing AI model to travel on a track.

The m sets of AI parameters in a first generation of parameter set are generated by the AI parameter configuration device randomly, or, are set by the developer according to experience, and AI parameters in each subsequent generation of parameter set are generated based on AI parameters in a last generation of parameter set.

To perform a genetic iteration on the AI parameters according to a gene manner, complex AI parameters need to be encoded first to obtain a corresponding gene sequence. Common encoding methods include binary encoding and value encoding. When the binary encoding is adopted, the AI parameters are encoded as a binary character string; and when the value encoding is adopted, the AI parameters are encoded as a parameter value combination.

However, when the binary encoding is adopted, improper parameters may be generated when performing the crossover and mutation, resulting in a relatively slow convergence rate of the genetic algorithm. Therefore, to prevent the improper parameters from being generated during the crossover and mutation, and to improve the convergence rate of the genetic algorithm, the value encoding is adopted for the AI parameters in the embodiments of this application.

The AI parameters include related parameters used for indicating a travel manner and a travel policy of the race car AI model.

In a possible implementation, the AI parameters include parameter types such as distance, angle, velocity, and Boolean value. Optionally, the distance parameter represents a safety distance between the race car AI model and a track boundary, that is, when a distance between the race car AI model and the track boundary is less than the safety distance, the race car AI model adjusts a travel angle to be away from the track boundary; the angle parameter represents an included angle between a turning velocity of the race car AI model and a direction of the car head; the velocity parameter represents the turning velocity of the race car AI model; and the Boolean value represents whether the race car AI model adopts a predetermined policy (e.g., whether to adopt a quick turning policy).

In other possible implementations, when the AI parameters include a curve indicating correspondences between parameters, encoding is performed by using an interpolation curve. When encoding is performed by using the interpolation curve, three interpolating points in the curve are determined first, and then coordinates and slopes of the three interpolating points are encoded. By using this method, a curve may be encoded into a series of curve parameters.

Figure 4:
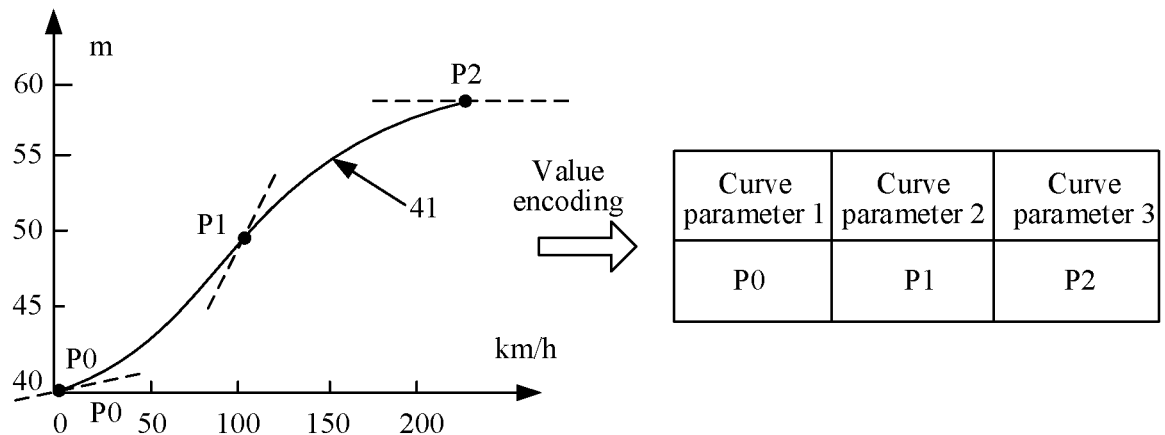
FIG. 4 is a schematic implementation diagram of performing value encoding on a curve according to an embodiment of this application.

For example, as shown in FIG. 4, a curve 41 is used for representing a correspondence between a current velocity and a distance to a navigation point. Based on the curve 41, the race car AI model finds a distance to a next navigation point at the current velocity, so as to determine navigation points on a track according to the distance, and further to determine whether to make a turn according to an included angle between the navigation point and a direction of the current velocity. To perform the value encoding on the curve 41 is to determine interpolating points P0, P1, and P2 in the curve 41, and to perform encoding by using coordinates and slopes of P0, P1, and P2 as curve parameters.

In an exemplary example, encoded AI parameters are shown in Table 1.

TABLE 1

| | Parameter types | | | | | | |
|---|---|---|---|---|---|---|---|
| | Distance | Angle | Velocity | Boolean value | Curve parameter 1 | Curve parameter 2 | Curve parameter 3 ... |
| AI parameter | 120 m | 30° | 200 km/s | True | 100° | 200° | 123° ... |

This embodiment uses an example in which the AI parameters include the foregoing parameter types for exemplary description. In an actual application process, the developer may set parameters other than the foregoing parameter types according to requirements, and specific parameter types included in the AI parameters are not limited in the embodiments of this application.

In step 302, the race car AI model is controlled to undergo an adaptation degree test for m times according to the m sets of AI parameters to obtain m adaptation degrees, the adaptation degree and a travel distance of the race car AI model on the track according to the AI parameters being positively correlated. For example, a racing AI model is controlled to undergo an adaptation degree test according to each of the m sets of AI parameters to obtain m adaptation degrees, the m adaptation degrees being positively correlated with travel distances of the racing AI model on the track according to the m sets of AI parameters To quantify the degree of adaptation of each set of AI parameters to the track, the AI parameter configuration device controls the race car AI model to travel on the track according to each set of AI parameters, so as to determine an adaptation degree of each set of AI parameters according to a travel result.

A higher adaptation degree of the AI parameters indicates a longer travel distance of the race car AI model on the track according to the AI parameters in unit duration; otherwise, indicates a shorter travel distance of the race car AI model on the track according to the AI parameters.

In a possible implementation, the AI parameter configuration device controls the race car AI model to travel on the track for the unit duration according to each set of AI parameters, and determines the adaptation degree of each set of AI parameters according to the travel distance in the unit duration; or the AI parameter configuration device controls the race car AI model to travel on the track by a unit distance according to each set of AI parameters, and determines the adaptation degree of each set of AI parameters according to duration used for traveling by the unit distance.

In step 303, a $(n+1)^{th}$ generation of parameter set (e.g., a second parameter set) is generated according to the $n^{th}$ generation of parameter set in a case that all the m adaptation degrees are less than an adaptation degree threshold. For example, a second parameter set according to the first parameter set is generated in a case that all the m adaptation degrees are less than an adaptation degree threshold.

After performing the adaptation degree test on each generation of parameter set, the AI parameter configuration device detects a relationship between each adaptation degree and the adaptation degree threshold. If the m adaptation degrees are all less than the adaptation degree threshold, it is determined that there is no expected AI parameter in the $n^{th}$ generation of parameter set, so that the $(n+1)^{th}$ generation of parameter set is generated through an iteration according to the $n^{th}$ generation of parameter set, and the adaptation degree test is further performed on the $(n+1)^{th}$ generation of parameter set (e.g., step 301 and step 302 can be performed repeatedly). Optionally, the adaptation degree threshold is a target travel distance of the race car AI model on the track in the unit duration.

Optionally, to accelerate the convergence rate of the genetic algorithm, and further to shorten configuration duration of the AI parameters, the AI parameter configuration device may generate the $(n+1)^{th}$ generation of parameter set by presetting an acceleration convergence policy. The acceleration convergence policy includes at least one of elitism, a catastrophe policy, a mutation policy, and a parent AI parameter selection policy.

In step 304, in a case that there is a target adaptation degree in the m adaptation degrees that is greater than the adaptation degree threshold, an AI parameter corresponding to the target adaptation degree is configured as a target AI parameter. For example, in a case that a target adaptation degree in the m adaptation degrees is greater than the adaptation degree threshold, an AI parameter corresponding to the target adaptation degree is configured as a target AI parameter If there is at least one target adaptation degree in the m adaptation degrees that is greater than the adaptation degree threshold, the AI parameter configuration device determines that there are the expected AI parameters in the $n^{th}$ generation of parameter set, so as to configure the AI parameter corresponding to the target adaptation degree as the target AI parameter, and stop the iteration.

Optionally, the AI parameter configuration device determines an AI parameter corresponding to the maximum adaptation degree as the target AI parameter.

To sum up, in this embodiment, the $n^{th}$ generation of parameter set including the m sets of AI parameters is obtained, and the race car AI model is controlled to undergo the adaptation degree test form times according to the m sets of AI parameters, so that the $(n+1)^{th}$ generation of parameter set is generated according to the $n^{th}$ generation of parameter set in a case that the m adaptation degrees obtained through the test are all less than the adaptation degree threshold, and a next round of adaptation degree test is performed; and a target AI parameter is configured according to the AI parameter corresponding to the target adaptation degree in a case that the target adaptation degree in the m adaptation degrees obtained through the test is greater than the adaptation degree threshold. Compared with adjusting the AI parameters manually, the AI parameters are automatically adjusted by using a genetic algorithm, thereby improving the efficiency of adjusting and configuring the AI parameters; and a parameter coverage rate is higher when the genetic algorithm is used for adjusting the AI parameters, thereby facilitating improvement in the quality of the AI parameters.

Furthermore, this embodiment provides an encoding mode applied to the race car AI parameters. Compared with the binary encoding, in this embodiment, the race car AI parameter is encoded by using the value encoding mode, and the probability of generating an invalid parameter combination during subsequent crossover and mutation can be reduced, to further improve the convergence rate of the genetic algorithm.

The key to biological evolution is genetic inheritance. In the embodiments of this application, the AI parameter configuration device selects the parent AI parameter and performs the crossover and mutation on the parent AI parameter, so that the parent AI parameter is passed on to the child AI parameter. Moreover, to increase the probability of passing excellent AI parameters (e.g., excellent genes) on to the child generation and therefore accelerate the convergence rate, the AI parameter configuration device selects the parent AI parameters from the parameter set through a predetermined selection policy. A schematic embodiment is provided below for description.

Figure 5:
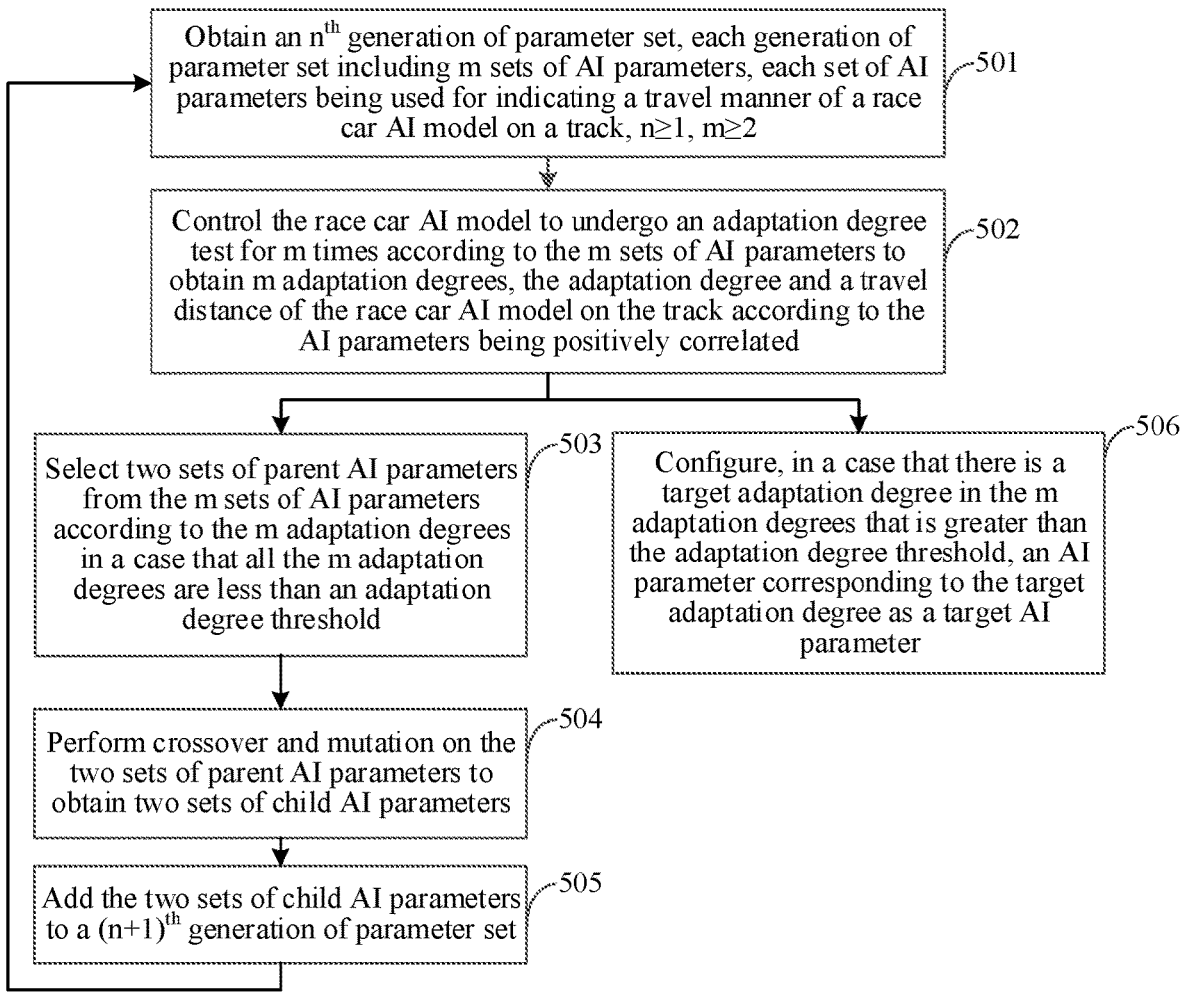
FIG. 5 is a flowchart of an AI parameter configuration method according to another embodiment of this application.

FIG. 5 is a flowchart of an AI parameter configuration method according to another embodiment of this application. This embodiment uses an example in which the AI parameter configuration method is applied to an AI parameter configuration device for description, and the method may include the following steps.

In step 501, an $n^{th}$ generation of parameter set is obtained, each generation of parameter set including m sets of AI parameters, each set of AI parameters being used for indicating a travel manner of a race car AI model on a track, n≥1, m≥2.

An implementation of this step is similar to that of step 301, and is not described again in this embodiment.

For example, the parameter set obtained by the AI parameter configuration device includes 50 sets of AI parameters. To facilitate exemplification, in each of the following embodiments, an example in which each generation of parameter set includes 50 sets of AI parameters is used for description.

In step 502, the race car AI model is controlled to undergo an adaptation degree test for m times according to the m sets of AI parameters to obtain m adaptation degrees, the adaptation degree and a travel distance of the race car AI model on the track according to the AI parameters being positively correlated.

An implementation of this step is similar to that of step 302, and is not described again in this embodiment.

For example, the AI parameter configuration device selects one set of AI parameters every time, controls the race car AI model to travel on the track for one minute according to the AI parameters, and determines a travel distance of the race car AI model in the one minute as an adaptation degree, to finally obtain 50 adaptation degrees. To facilitate exemplification, in each of the following embodiments, an example in which an adaptation degree is a travel distance of the race car AI model in one minute is used for description.

In step 503, two sets of parent AI parameters are selected from the m sets of AI parameters according to the m adaptation degrees in a case that all the m adaptation degrees are less than an adaptation degree threshold.

In a possible implementation, the AI parameter configuration device randomly selects two sets of AI parameters from the m sets of AI parameters as the parent AI parameters, that is, a probability of selecting each set of AI parameters is 1/m.

However, because there are AI parameters with relatively low adaptation degrees in the m sets of AI parameters, when a genetic iteration is performed by using the AI parameters with the relatively low adaptation degrees as the parent, adaptation degrees of generated child AI parameters are usually relatively low, thereby affecting the convergence rate of the genetic algorithm. Therefore, to increase probabilities of selecting the AI parameters with high adaptation degrees, so as to improve the convergence rate of the genetic algorithm, the AI parameter configuration device distributes different selection probabilities for different AI parameters according to the adaptation degree of each set of AI parameters, where a higher adaptation degree of an AI parameter indicates a higher selection probability of the AI parameter.

In a possible implementation, the AI parameter configuration device sets the selection probability of the AI parameter as: a proportion of an adaptation degree corresponding to the AI parameter to a total sum of adaptation degrees in the parameter set to which the AI parameter belongs. The mathematical expression of the selection probability is:

$$P_{(k)} = \frac{F_{(k)}}{\sum_{i=0}^{m} F_{(i)}}$$

where $P_{(k)}$ is a selection probability of the $k^{th}$ set of AI parameters, $F_{(k)}$ is an adaptation degree of the $k^{th}$ set of AI parameters, and m is a total quantity of sets of AI parameters in the parameter set.

For example, the parameter set includes 5 sets of AI parameters, and the adaptation degree of each set of AI parameters is shown in Table 2.

TABLE 2

| AI parameter number | Adaptation degree (meter) | Selection probability |
| --- | --- | --- |
| 1 | 3000 | 3000/17500 = 17% |
| 2 | 3200 | 3200/17500 = 18% |
| 3 | 3500 | 3500/17500 = 20% |
| 4 | 3800 | 3800/17500 = 22% |
| 5 | 4000 | 4000/17500 = 23% |

According to data shown in Table 2, a selection probability of a first set of AI parameters is 3000/17500=17%, a selection probability of a second set of AI parameters is 3200/17500=18%, a selection probability of a third set of AI parameters is 3500/17500=20%, a selection probability of a fourth set of AI parameters is 3800/17500=22%, and a selection probability of a fifth set of AI parameters is 4000/17500=23%.

Figure 6:
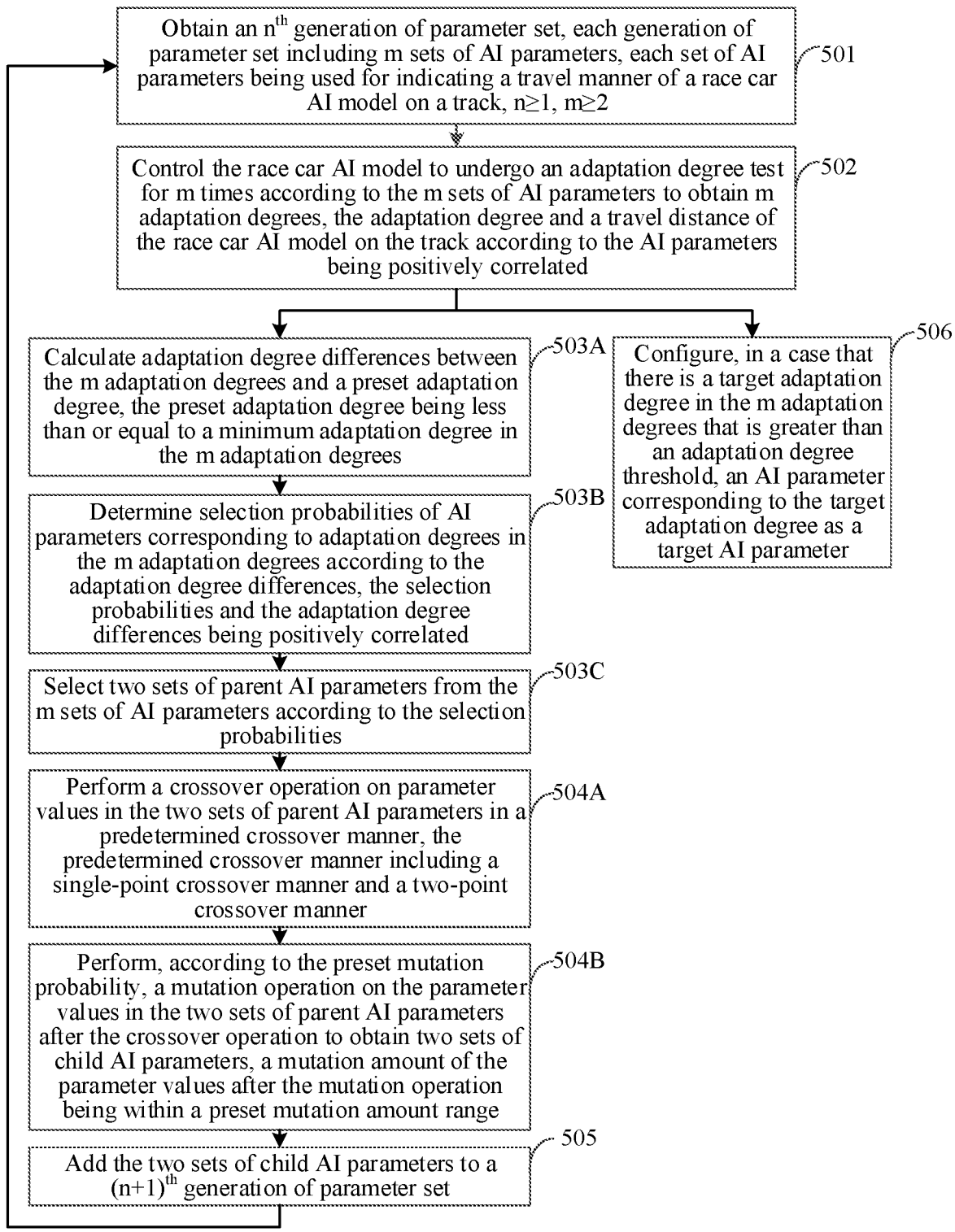
FIG. 6 is a flowchart of an AI parameter configuration method according to another embodiment of this application.

However, the selection probabilities of the AI parameters are set by using the foregoing manners, and when differences between adaptation degrees corresponding to the AI parameters are relatively small, the selection probabilities of the sets of AI parameters are relatively close to each other, resulting in a relatively slow convergence rate. To further increase the selection probability of the AI parameters with the high adaptation degrees and improve the convergence rate, optionally, as shown in FIG. 6, this step may include the following steps.

In step 503A, adaptation degree differences between the m adaptation degrees and a preset adaptation degree are calculated, the preset adaptation degree being less than or equal to a minimum adaptation degree in the m adaptation degrees.

Optionally, after the m adaptation degrees are obtained through calculation, the AI parameter configuration device obtains the minimum adaptation degree in the m adaptation degrees, and determines a preset adaptation degree less than or equal to the minimum adaptation degree. After the preset adaptation degree is determined, the AI parameter configuration device calculates an adaptation degree difference between each adaptation degree and the preset adaptation degree.

With reference to the data in Table 2, the AI parameter configuration device determines a minimum adaptation degree of 3000 as the minimum adaptation degree, and the adaptation degree differences obtained through calculation are shown in Table 3.

TABLE 3

| AI parameter number | Adaptation degree difference (meter) | Selection probability |
| --- | --- | --- |
| 1 | 3000 − 3000 = 0 | 0/2500 = 0% |
| 2 | 3200 − 3000 = 200 | 200/2500 = 8% |
| 3 | 3500 − 3000 = 500 | 500/2500 = 20% |
| 4 | 3800 − 3000 = 800 | 800/2500 = 32% |
| 5 | 4000 − 3000 = 1000 | 1000/2500 = 40% |

To avoid a case in which an excessively large selection probability of the AI parameters with high adaptation degrees affects the genetic diversity of the AI parameters, the preset adaptation degree is usually less than the minimum adaptation degree in the m adaptation degrees. For example, the preset adaptation degree is set to 2000.

In step 503B, selection probabilities of AI parameters corresponding to adaptation degrees in the m adaptation degrees are determined according to the adaptation degree differences, the selection probabilities and the adaptation degree differences being positively correlated.

Furthermore, the AI parameter configuration device determines a selection probability of each set of AI parameters according to a proportion of an adaptation degree difference corresponding to the AI parameters to a total sum of adaptation degree differences. The mathematical expression of the selection probability is:

$$P_{(k)} = \frac{F_{(k)} - F}{\sum_{i=0}^{m}(F_{(i)} - F)}$$

where $P_{(k)}$ is a selection probability of the $k^{th}$ set of AI parameters, $F_{(k)}$ is an adaptation degree of the $k^{th}$ set of AI parameters, m is a total quantity of sets of AI parameters in the parameter set, and F is the preset adaptation degree.

According to data shown in Table 3, the selection probability of the first set of AI parameters is 0/2500=0%, the selection probability of the second set of AI parameters is 200/2500=8%, the selection probability of the third set of AI parameters is 500/2500=20%, the selection probability of the fourth set of AI parameters is 800/2500=32%, and the selection probability of the fifth set of AI parameters is 1000/2500=40%.

In step 503C, two sets of parent AI parameters are selected from the m sets of AI parameters according to the selection probabilities.

According to the selection probability corresponding to each set of AI parameters, the AI parameter configuration device selects two sets of AI parameters from the m sets of AI parameters as the parent AI parameters, where the two sets of AI parameters are used for generating the child AI parameter in the $(n+1)^{th}$ generation of parameter set subsequently.

In step 504, crossover and mutation on the two sets of parent AI parameters are performed to obtain two sets of child AI parameters.

Generating the child AI parameter according to the parent AI parameter includes two operations: crossover and mutation. The crossover operation is used for passing parent genes on to the child generation, to ensure that excellent AI parameters are passed on to the next generation, and the mutation operation is used for breaking through the parent gene category to achieve evolution. As shown in FIG. 6, this step may include the following steps.

In step 504A, the crossover operation is performed on parameter values in the two sets of parent AI parameters in a predetermined crossover manner, the predetermined crossover manner including a single-point crossover manner and a two-point crossover manner.

Optionally, when the single-point crossover manner is adopted, the AI parameter configuration device determines a crossover point of the same position in the two sets of parent AI parameters, and exchanges parameters after the crossover point.

Figure 7:
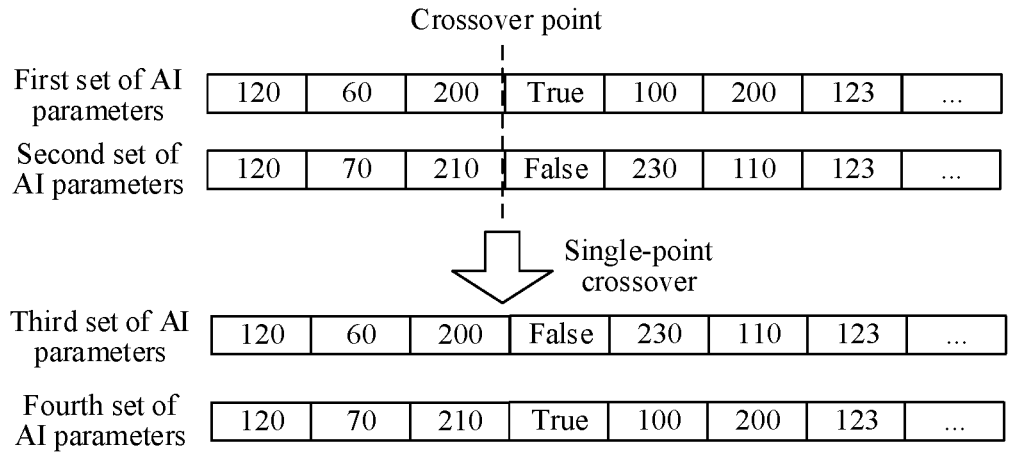
FIG. 7 is a schematic implementation diagram of performing a single-point crossover operation on parent AI parameters according to an embodiment of this application.

For example, as shown in FIG. 7, the AI parameter configuration device determines that the crossover point is located at a third parameter, so as to exchange a fourth parameter to a last parameter in a first set of AI parameters and a second set of AI parameters, to obtain a third set of AI parameters and a fourth set of AI parameters.

Optionally, when the two-point crossover manner is adopted, the AI parameter configuration device determines a first crossover point and a second crossover point in the two sets of parent AI parameters, and exchanges parameters between the first crossover point and the second crossover point.

Figure 8:
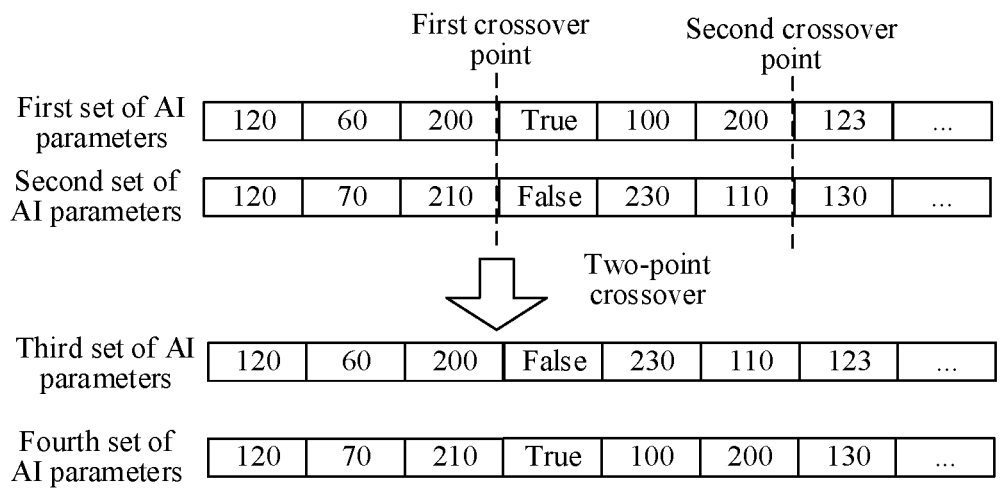
FIG. 8 is a schematic implementation diagram of performing a two-point crossover operation on parent AI parameters according to an embodiment of this application.

For example, as shown in FIG. 8, the AI parameter configuration device determines that the first crossover point is located at the third parameter and the second crossover point is located at a sixth parameter, so as to exchange the fourth parameter to the sixth parameter (which are True, 100, 200, False, 230, and 110 respectively) in the first set of AI parameters and the second set of AI parameters, to obtain the third set of AI parameters and the fourth set of AI parameters.

In step 504B, according to the preset mutation probability, a mutation operation is performed on the parameter values in the two sets of parent AI parameters after the crossover operation to obtain the two sets of child AI parameters, a mutation amount of the parameter values after the mutation operation being within a preset mutation amount range.

After the crossover operation is completed, the AI parameter configuration device performs the mutation operation on the AI parameter in the parent AI parameters according to the preset mutation probability. Usually, the preset mutation probability is set by the developers according to experience, so as to avoid the randomness caused by an excessively high mutation probability and the local optimal solution caused by an excessively low mutation probability. For example, the preset mutation probability is set to 0.1%.

It is found in the actual application process that, an invalid parameter combination may be generated by performing a blind mutation operation on the AI parameters, and the genetic convergence rate may be affected. Optionally, when the mutation operation is performed on the AI parameters, the AI parameter configuration device controls the mutation amount of the parameters, that is, ensures that the mutation amount of the parameter values after the mutation operation is within a preset mutation amount range, so as to prevent invalid parameters from being generated by the blind mutation operation, to further improve the convergence rate.

In a possible implementation, the AI parameter configuration device presets corresponding mutation amounts for different types of parameters. For example, a mutation amount of the angle parameter is set to be from −30° to 30°, a mutation amount of an included angle parameter (e.g., the included angle between the car head of the race car and the direction of the velocity) is set to be from −90° to 90°, a mutation amount of the velocity parameter is set to be from −50 km/h to 50 km/h, and a parameter amplification factor is set to be from 0.1 to 3.

In other possible implementations, the AI parameter configuration device sets parameter ranges for different types of parameters. For example, a parameter range of the angle parameter is set to be from 0° to 360°, and a parameter range of the velocity parameter is set to be from 0 km/h to 300 km/h.

Figure 9:
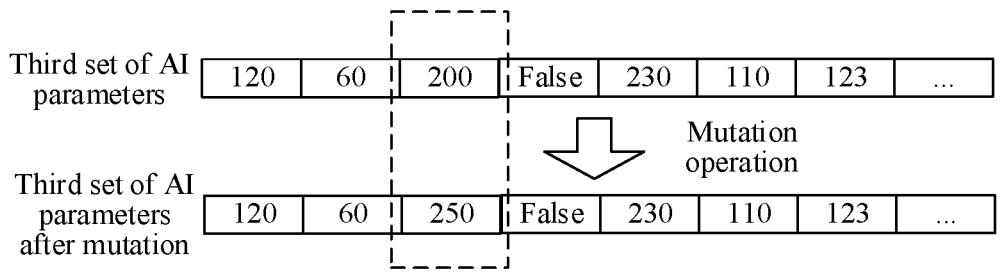
FIG. 9 is a schematic implementation diagram of performing a mutation operation on AI parameters according to an embodiment of this application.

For example, as shown in FIG. 9, when the AI parameter configuration device performs the mutation operation on the third parameter (the velocity parameter) in the third set of AI parameters, the third parameter mutates into 250 according to the mutation amount range from −50 km/h to 50 km/h corresponding to the velocity parameter.

Through the foregoing steps, the AI parameter configuration device generates two sets of child AI parameters according to the two sets of parent AI parameters.

In step 505, the two sets of child AI parameters are added to the $(n+1)^{th}$ generation of parameter set.

The AI parameter configuration device adds the two sets of generated child AI parameters to the $(n+1)^{th}$ generation of parameter set, and repeatedly performs step 503 and step 504 for m/2 times, so that the $(n+1)^{th}$ generation of parameter set includes m sets of AI parameters.

For example, after the AI parameter configuration device repeatedly performs the foregoing steps for 25 times, a $(n+1)^{th}$ generation of parameter set including 50 sets of AI parameters is obtained.

For the generated $(n+1)^{th}$ generation of parameter set, the AI parameter configuration device repeatedly performs step 501 and step 502 until an adaptation degree of at least one set of AI parameters in the parameter set is greater than the adaptation degree threshold.

In step 506, in a case that there is a target adaptation degree in the m adaptation degrees that is greater than the adaptation degree threshold, an AI parameter corresponding to the target adaptation degree is configured as a target AI parameter.

An implementation of this step is similar to that of step 304, and is not described again in this embodiment.

In this embodiment, the selection manner of the parent AI parameters is optimized, and the selection probability of each set of AI parameters is determined based on the adaptation degree differences between the adaptation degrees of the AI parameters and the preset adaptation degree. Compared with determining the selection probability of the AI parameters according to the adaptation degree of the AI parameters directly, the selection probability of the AI parameters with the low adaptation degree can be reduced, and the selection probability of the AI parameters with the high adaptation degree can be increased, so that the probability of passing the excellent genes on to the child AI parameter is increased, thereby improving the convergence rate of the genetic algorithm and accelerating the configuration speed of the AI parameters.

In addition, in this embodiment, when the mutation operation is performed on the AI parameters, the AI parameter configuration device controls the mutation amount of the parameters, to ensure that the mutation amount of the parameter values after the mutation operation is within the preset mutation amount range, so as to prevent the invalid parameters from being generated by the blind mutation operation, to further improve the convergence rate.

Figure 10:
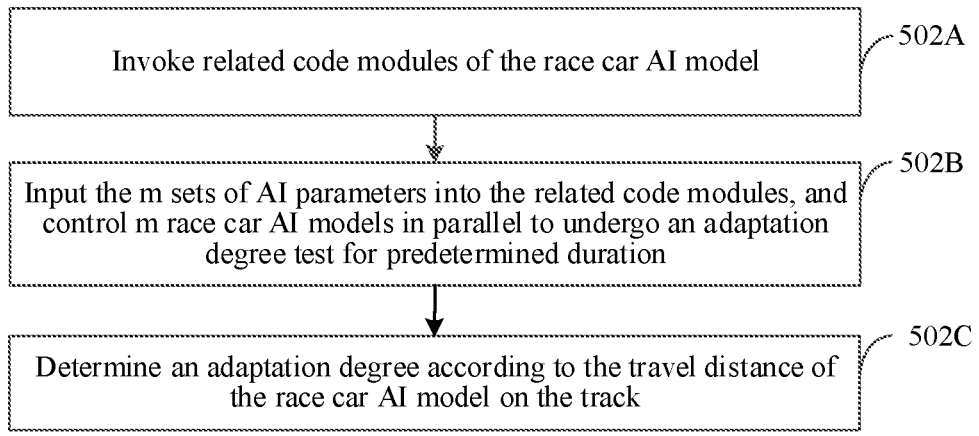
FIG. 10 is a flowchart of an adaptation degree test procedure related to the AI parameter configuration method shown in FIG. 5.

In an initial stage, the AI parameters are random to some extent, and the race car AI model may need to consume a relatively long time to reach a unit travel distance when traveling on the track according to relatively poor AI parameters (the AI parameters with relatively low adaptation degrees). Therefore, when determining the adaptation degree of the AI parameter in a manner of "calculating duration used for traveling by a unit distance", test duration is uncontrollable. In view of the foregoing reasons, in the embodiments of this application, the AI parameter configuration device determines the adaptation degree of the AI parameter in a manner of "calculating the travel distance in the unit duration". On the basis of the embodiment shown in FIG. 5, as shown in FIG. 10, step 502 includes the following steps.

In step 502A, related code modules of the race car AI model are invoked.

A quantity of code modules implementing a game application is large, and if the adaptation degree test is performed by invoking all the code modules, unnecessary computing resources may be consumed, thereby affecting the test speed. Therefore, to reduce the quantity of calculation and improve the test speed, an AI parameter test device invokes only the related code modules of the race car AI model to perform the adaptation degree test.

Optionally, the related code modules includes at least an AI code module, a race car code module, and a physical code module; the AI code module being configured to control the race car AI model to travel on the track according to the AI parameters, the race car code module being configured to update a position of the race car AI model on the track (e.g., to update a travel distance of the race car AI model), and the physical code module being configured to process a collision between the race car AI model and the track.

Figure 11:
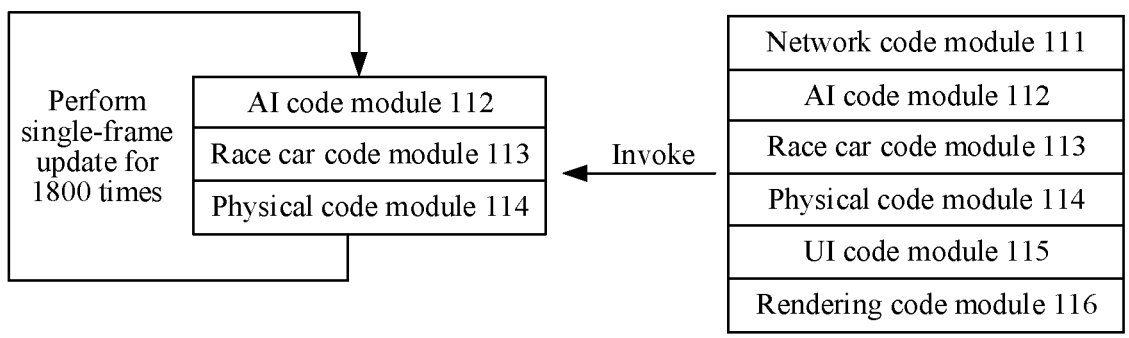
FIG. 11 is a schematic implementation diagram of invoking related code modules to perform an adaptation degree test according to an embodiment of this application.

For example, as shown in FIG. 11, a game application includes a network code module 111, an AI code module 112, a race car code module 113, a physical code module 114, a user interface (UI) code module 115, and a rendering code module 116. The network code module 111 is responsible for network communication (e.g., receiving data from a server or transmitting data to the server), the UI code module 115 is responsible for constructing a UI, and the rendering code module 116 is responsible for rendering and displaying the constructed UI. However, when the adaptation degree test is performed, the foregoing code modules do not affect the test result. Therefore, the AI parameter configuration device only invokes the AI code module 112, the race car code module 113, and the physical code module 114 to perform the adaptation degree test.

In this embodiment, only an example in which the related code modules of the race car AI model include the AI code module, the race car code module, and the physical code module is used for exemplary description. In other possible implementations, the race car AI model may further include other types of related code modules. For example, when the track changes, the related code modules further include a track code module. This is not limited in the embodiments of this application.

In step 502B, the m sets of AI parameters are input into the related code modules, and m race car AI models are controlled in parallel to undergo an adaptation degree test for predetermined duration.

When the adaptation degree of the AI parameter is determined in a manner of "calculating a travel distance in unit duration", the AI parameter configuration device controls the race car AI model to travel on the track for unit duration t according to the AI parameters, and then determines the adaptation degree of the AI parameter according to the travel distance of the race car AI model, and the unit duration may be 1 minute.

However, when the genetic algorithm is adopted, an expected effect can be achieved usually only through more than 100,000 iterations. A very long time is consumed if race car AI models are controlled in a serial manner to undergo the adaptation degree test (e.g., an adaptation degree test time consumed for each iteration is m*t). This obviously does not meet a requirement of quickly configuring the AI parameters.

To further improve the speed of the adaptation degree test, the AI parameter configuration device simultaneously controls the m race car AI models in a parallel manner to undergo the adaptation degree test. For example, when the parameter set includes 50 sets of AI parameters, the AI parameter configuration device simultaneously controls 50 race car AI models to undergo the adaptation degree test.

Optionally, to avoid a case in which a collision occurs between the race car AI models to affect the test effect, the AI parameter configuration device turns off the collision mechanism between race cars when performing the adaptation degree test.

Because the adaptation degree test is performed by invoking the related code modules only, the predetermined duration can be further compressed. For example, as shown in FIG. 11, by invoking the AI code module 112, the race car code module 113, and the physical code module 114, the AI parameter configuration device compresses the original test duration from 1 minute into 1 s, and in 1 s, the AI parameter configuration device implements single-frame update for 1800 times (in an actual game process, images are at 30 frames per second, so that single-frame update needs to be performed for 1800 times when 1 minute is compressed into 1 second).

In step 502C, an adaptation degree is determined according to the travel distance of the race car AI model on the track.

In a possible implementation, the AI parameter configuration device directly determines the travel distance of the race car AI model as the adaptation degree of the AI parameter. For example, when the travel distance of the race car AI model according to the AI parameter is 3000 m, the adaptation degree of the AI parameter is 3000.

In this embodiment, only the related code modules of the race car AI model are invoked, and a plurality of race car AI models are controlled simultaneously in a parallel manner to undergo the adaptation degree test, so that the time consumed for the adaptation degree test is further compressed, thereby facilitating improvement in the configuration speed of the AI parameter.

Figure 12:
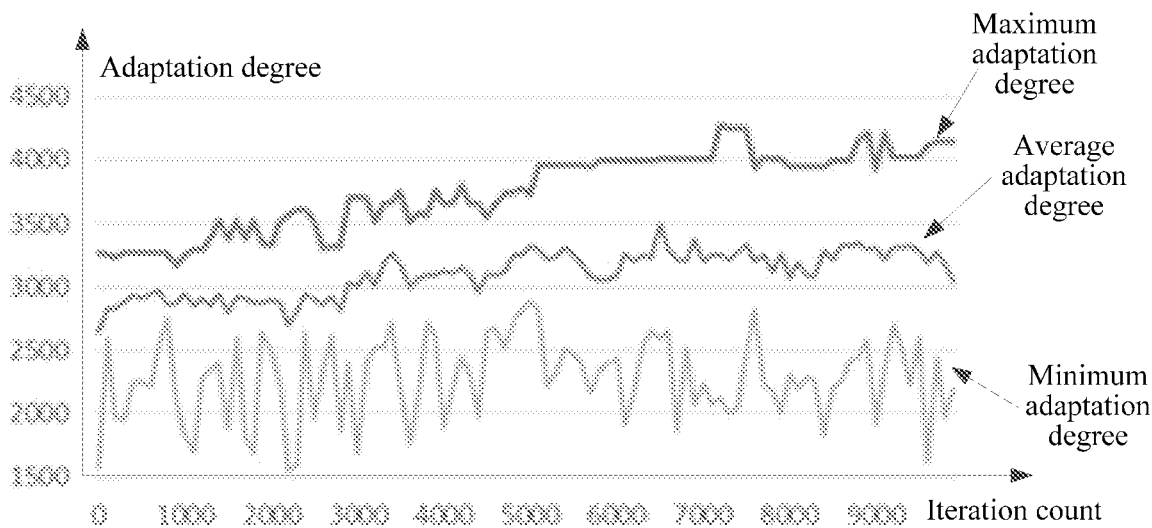
FIG. 12 is a curve graph used for representing a correspondence between iteration counts and adaptation degrees according to an embodiment of this application.
Figure 13:
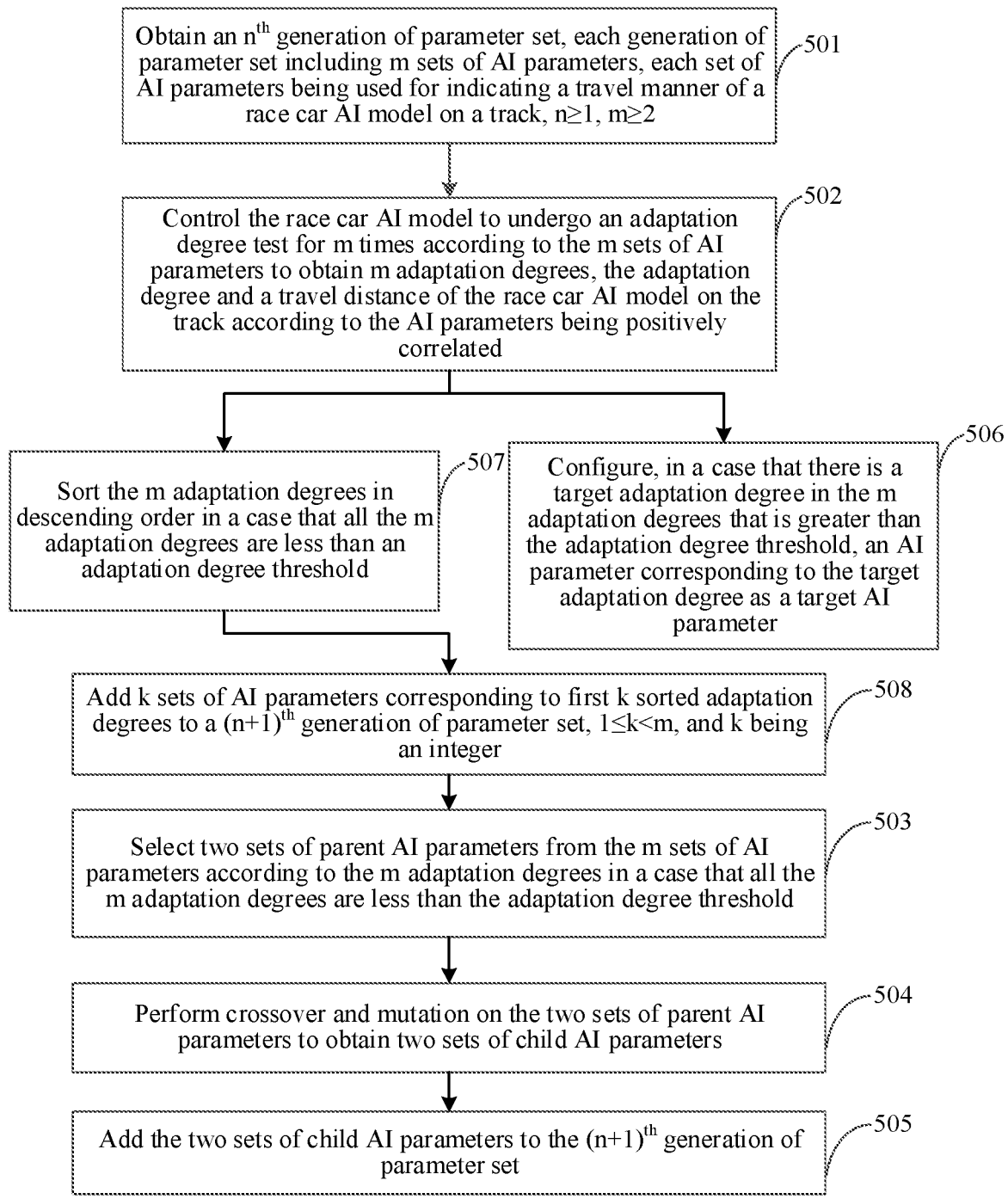
FIG. 13 is a flowchart of an AI parameter configuration method according to another embodiment of this application.

When the AI parameter is configured in the foregoing manner, sampling is performed every 100 generations, to obtain a correspondence between iteration counts and adaptation degrees shown in FIG. 12. It is found by analyzing FIG. 12 that, when the AI parameter is configured in the foregoing manner, an optimal AI parameter in each generation of parameter set is lost during the iteration (showing a decrease of the maximum adaptation degree); and an overall convergence rate is slow. To resolve the foregoing problem, the AI parameter configuration device introduces the elitism and the catastrophe policy during the genetic iteration. Optionally, based on FIG. 5, as shown in FIG. 13, the following steps are further included before step 503.

In step 507, the m adaptation degrees are sorted in descending order in a case that all the m adaptation degrees are less than the adaptation degree threshold.

To pass an AI parameter with a relatively high adaptation degree in the current parameter set on to a next generation of parameter set, so as to prevent the maximum adaptation degree from being reduced during the iteration, to further improve the iteration speed, the AI parameter configuration device sorts the m adaptation degrees obtained through the test in descending order.

In step 508, k sets of AI parameters corresponding to first k sorted adaptation degrees are added to the $(n+1)^{th}$ generation of parameter set, $1 \leq k < m$, and k being an integer.

Further, the AI parameter configuration device adds the k sets of AI parameters corresponding to the first k sorted adaptation degrees to the $(n+1)^{th}$ generation of parameter set by using the elitism, that is, directly copies the AI parameters with a relatively high adaptation degree to the next generation.

For example, the AI parameter configuration device adds two sets of AI parameters with the maximum adaptation degree to the next generation of parameter set.

After the AI parameters with the high adaptation degree are added, the AI parameter configuration device further generates a parameter set including the m sets of AI parameters in a manner of selecting the parent AI parameter and generating the child AI parameter (e.g., step 503 to step 505).

Figure 14:
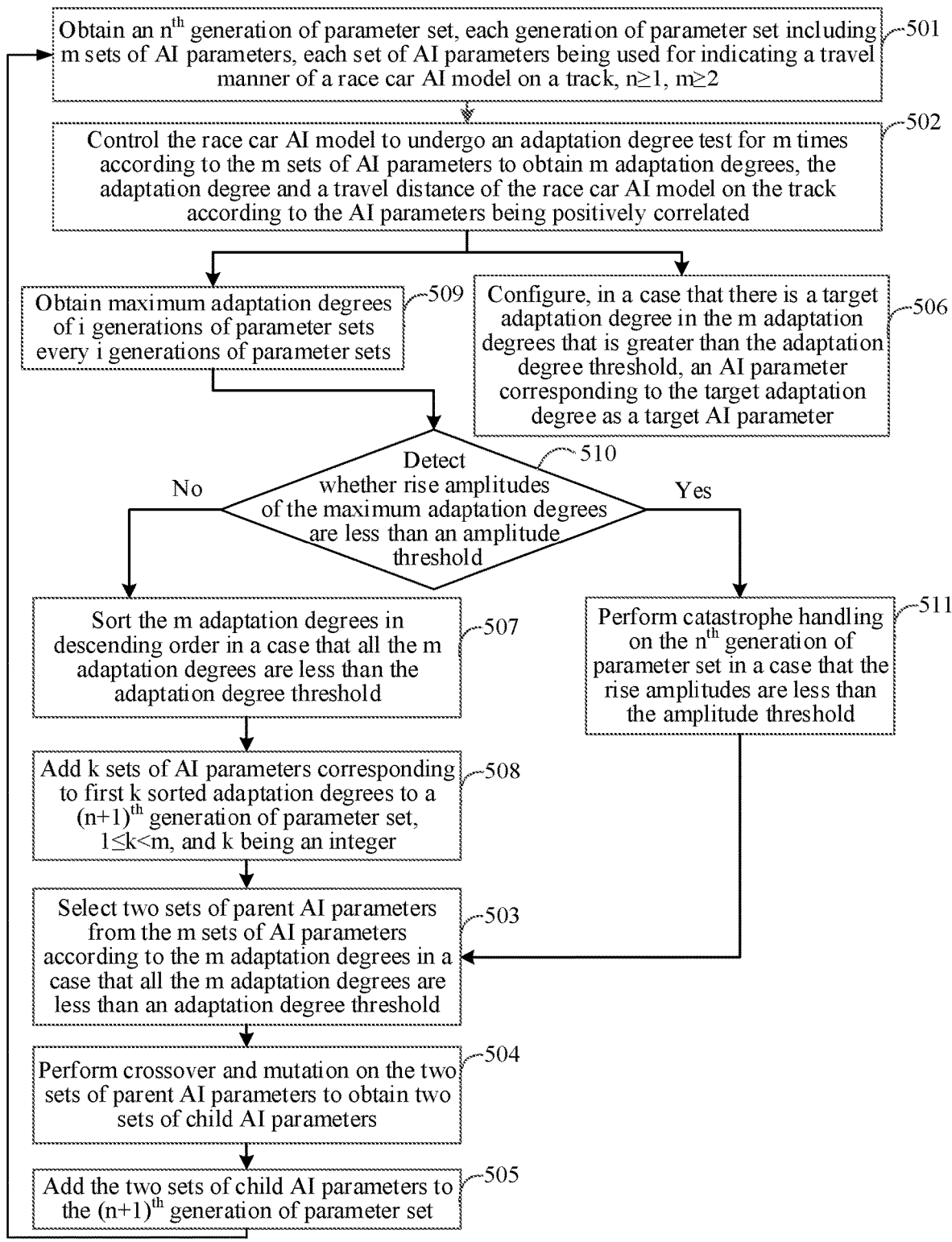
FIG. 14 is a flowchart of an AI parameter configuration method according to another embodiment of this application.

The convergence rate of the iteration may be improved through the elitism, but the diversity of the AI parameters in the parameter set may be reduced, to fall into a local optimal solution during the subsequent iteration. To avoid falling into the local optimal solution while improving the convergence rate, the AI parameter configuration device introduces the catastrophe policy during the iteration. Optionally, based on FIG. 13, as shown in FIG. 14, the following steps are further included after step 502.

In step 509, maximum adaptation degrees of i generations of parameter sets are obtained every i generations of parameter sets.

To determine whether to fall into the local optimal solution, the AI parameter configuration device obtains maximum adaptation degrees of latest i generations of parameter sets every i generations of parameter sets during the iteration.

For example, the AI parameter configuration device obtains maximum adaptation degrees of the latest 100 generations of parameter sets every 100 generations of parameter sets.

In step 510, whether rise amplitudes of the maximum adaptation degrees are less than an amplitude threshold is detected.

For the obtained i maximum adaptation degrees, the AI parameter configuration device detects whether the rise amplitudes of the i maximum adaptation degrees are less than the amplitude threshold. If yes, it is determined that the local optimal solution is fallen into, and the catastrophe handling is performed through the following step 511; if no, it is determined that the local optimal solution is not fallen into, and step 507 continues to be performed. The amplitude threshold may be in a form of a ratio or a difference. When the amplitude threshold is represented by using a ratio, the amplitude threshold is 20%; when the amplitude threshold is represented by using a difference, the amplitude threshold is 1000.

In a possible implementation, when the elitism is introduced during the iteration, the adaptation degree of each set of parameter sets is on a rising trend, so that the AI parameter configuration device determines the rise amplitudes of the maximum adaptation degrees by calculating ratios of a maximum adaptation degree of the current parameter set to the maximum adaptation degrees of the first i generations of parameter sets. For example, when the current parameter set is the $1000^{th}$ generation of parameter set and i=100, the AI parameter configuration device determines (e.g., a maximum adaptation degree of the $1000^{th}$ generation of parameter set/a maximum adaptation degree of the $900^{th}$ generation of parameter set−1) as the amplitude threshold.

In step 511, catastrophe handling is performed on the $n^{th}$ generation of parameter set in a case that the rise amplitudes are less than the amplitude threshold.

The AI parameter configuration device is provided with a small catastrophe policy and a big catastrophe policy. In a possible implementation, when the rise amplitudes of the adaptation degrees are less than the amplitude threshold, and a difference between a maximum adaptation degree of the $n^{th}$ generation of parameter set and the adaptation degree threshold is less than a preset difference threshold (e.g., the adaptation degree is close to the expectation), the AI parameter configuration device performs the small catastrophe handling on the $n^{th}$ generation of parameter set; and when the rise amplitudes of the adaptation degrees are less than the amplitude threshold, and the difference between the maximum adaptation degree of the $n^{th}$ generation of parameter set and the adaptation degree threshold is greater than the preset difference threshold (e.g., the adaptation degree is far away from the expectation), the AI parameter configuration device performs the big catastrophe handling on the $n^{th}$ generation of parameter set. For example, the difference threshold is 1500.

Optionally, when the small catastrophe handling is performed on the $n^{th}$ generation of parameter set, the AI parameter configuration device sorts the m adaptation degrees in descending order, and deletes j sets of AI parameters corresponding to first j sorted adaptation degrees, $1 \le j < m$, and j being an integer. Subsequently, the AI parameter configuration device generates the next generation of parameter set based on the parameter set after the catastrophe handling.

For example, when the small catastrophe handling is performed, the AI parameter configuration device deletes first two sets of AI parameters with the maximum adaptation degree in the current parameter set.

Optionally, when the big catastrophe handling is performed on the $n^{th}$ generation of parameter set, the AI parameter configuration device raises a mutation probability of each set of AI parameters in the $n^{th}$ generation of parameter set by a predetermined value, a probability that parameter mutation occurs being increased in a case of generating the $(n+1)^{th}$ generation of parameter set according to the $n^{th}$ generation of parameter set after the mutation probability is raised.

When the relatively low mutation probability cannot separate the iteration from the local optimal solution, the AI parameter configuration device improves the mutation probability of each set of AI parameters when generating the next generation of parameter set through the big catastrophe operation, so that the iteration is separated from the local optimal solution with the help of the relatively high mutation probability, and the global optimal solution is achieved.

For example, the preset mutation probability is 0.1%, and when the big catastrophe handling is performed, the AI parameter configuration device raises the preset mutation probability to be 5%.

In other possible implementations, the AI parameter configuration device may alternatively perform the catastrophe handling automatically every predetermined iteration duration or every predetermined iteration count. This is not limited in the embodiments of this application.

In this embodiment, the optimal AI parameter is passed on to the next generation directly by the AI parameter configuration device through the elitism, so that the convergence rate of the iteration is improved; moreover, the AI parameter configuration device determines whether the iteration falls into the local optimal solution by calculating the rise amplitudes of the adaptation degrees, and separates the iteration from the local optimal solution through the catastrophe handling in a case that the iteration falls into the local optimal solution, so that the global optimal solution is achieved, thereby further improving the convergence rate of the iteration.

The following is an apparatus embodiment of this application that can be used for executing the method embodiments of this application. For details not disclosed in the apparatus embodiment of this application, reference may be made to the method embodiments of this application.

Figure 15:
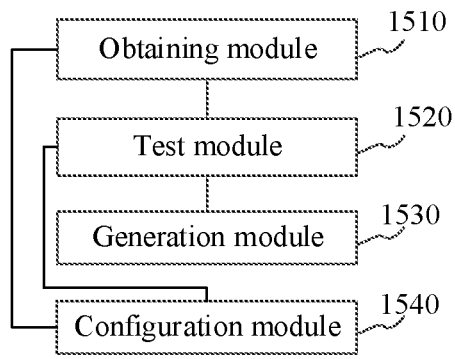
FIG. 15 is a block diagram of an AI parameter configuration apparatus according to an embodiment of this application.

FIG. 15 is a block diagram of an AI parameter configuration apparatus according to an embodiment of this application. The apparatus may be implemented by using hardware or may be implemented by using hardware executing corresponding software such as processing circuitry. The apparatus may include an obtaining module 1510, a test module 1520, a generation module 1530, and a configuration module 1540.

The obtaining module 1510 is configured to obtain an $n^{th}$ generation of parameter set, each generation of parameter set including m sets of AI parameters, each set of AI parameters being used for indicating a travel manner of a race car AI model on a track, $n \ge 1$, $m \ge 2$.

The test module 1520 is configured to control the race car AI model to undergo an adaptation degree test for m times according to the m sets of AI parameters to obtain m adaptation degrees, the adaptation degree and a travel distance of the race car AI model on the track according to the AI parameters being positively correlated.

The generation module 1530 is configured to generate a $(n+1)^{th}$ generation of parameter set according to the $n^{th}$ generation of parameter set in a case that all the m adaptation degrees are less than an adaptation degree threshold.

The configuration module 1540 is configured to configure, in a case that there is a target adaptation degree in the m adaptation degrees that is greater than the adaptation degree threshold, an AI parameter corresponding to the target adaptation degree as a target AI parameter.

Optionally, the generation module 1530 includes a selection unit, configured to select two sets of parent AI parameters from the m sets of AI parameters according to the m adaptation degrees; a crossover and mutation unit, configured to perform crossover and mutation on the two sets of parent AI parameters to obtain two sets of child AI parameters; and a first adding unit, configured to add the two sets of child AI parameters to the $(n+1)^{th}$ generation of parameter set.

Optionally, the selection unit is configured to calculate adaptation degree differences between the m adaptation degrees and a preset adaptation degree, the preset adaptation degree being less than or equal to a minimum adaptation degree in the m adaptation degrees; determine selection probabilities of AI parameters corresponding to adaptation degrees in the m adaptation degrees according to the adaptation degree differences, the selection probabilities and the adaptation degree differences being positively correlated; and select the two sets of parent AI parameters from the m sets of AI parameters according to the selection probabilities.

Optionally, value encoding is adopted for the m sets of AI parameters, and the crossover and mutation unit is configured to perform a crossover operation on parameter values in the two sets of parent AI parameters in a predetermined crossover manner, the predetermined crossover manner including a single-point crossover manner and a two-point crossover manner; and perform, according to a preset mutation probability, a mutation operation on the parameter values in the two sets of parent AI parameters after the crossover operation to obtain the two sets of child AI parameters, a mutation amount of the parameter values after the mutation operation being within a preset mutation amount range.

Optionally, the test module 1520 includes an invoking unit, a test unit, and a determining unit.

The invoking unit is configured to invoke related code modules of the race car AI model, the related code modules including at least an AI code module, a race car code module, and a physical code module; the AI code module being configured to control the race car AI model to travel on the track according to the AI parameters, the race car code module being configured to update a position of the race car AI model on the track, and the physical code module being configured to process a collision between the race car AI model and the track. The test unit is configured to input the m sets of AI parameters into the related code modules, and control the m race car AI models in parallel to undergo an adaptation degree test for predetermined duration, a collision mechanism between race cars being turned off during the adaptation degree test.

The determining unit is configured to determine the adaptation degree according to the travel distance of the race car AI model on the track.

Optionally, the generation module 1530 further includes a sorting unit, configured to sort the m adaptation degrees in descending order; and a second adding unit, configured to add k sets of AI parameters corresponding to first k sorted adaptation degrees to the $(n+1)^{th}$ generation of parameter set, $1 \leq k < m$, and k being an integer.

Optionally, the apparatus further includes an adaptation degree obtaining module, configured to obtain maximum adaptation degrees of i generations of parameter sets every i generations of parameter sets; a detection module, configured to detect whether rise amplitudes of the maximum adaptation degrees are less than an amplitude threshold; and a catastrophe module, configured to perform catastrophe handling on the $n^{th}$ generation of parameter set in a case that the rise amplitudes are less than the amplitude threshold; and the generation module 1530 is configured to generate the $(n+1)^{th}$ generation of parameter set according to the $n^{th}$ generation of parameter set after the catastrophe handling.

Optionally, the catastrophe module includes a first catastrophe unit or a second catastrophe unit.

The first catastrophe unit is configured to sort the m adaptation degrees in descending order; and delete j sets of AI parameters corresponding to first j sorted adaptation degrees, $1 \leq j < m$, and j being an integer.

The second catastrophe unit is configured to raise a mutation probability of each set of AI parameters in the $n^{th}$ generation of parameter set by a predetermined value, a probability that parameter mutation occurs being increased in a case of generating the $(n+1)^{th}$ generation of parameter set according to the $n^{th}$ generation of parameter set after the mutation probability is raised.

To sum up, in this embodiment, the $n^{th}$ generation of parameter set including the m sets of AI parameters is obtained, and the race car AI model is controlled to undergo the adaptation degree test form times according to the m sets of AI parameters, so that the $(n+1)^{th}$ generation of parameter set is generated according to the $n^{th}$ generation of parameter set in a case that the m adaptation degrees obtained through the test are all less than the adaptation degree threshold, and a next round of adaptation degree test is performed; and a target AI parameter is configured according to the AI parameter corresponding to the target adaptation degree in a case that the target adaptation degree in the m adaptation degrees obtained through the test is greater than the adaptation degree threshold. Compared with adjusting the AI parameters manually, the AI parameters are automatically adjusted by using a genetic algorithm, thereby improving the efficiency of adjusting and configuring the AI parameters; and a parameter coverage rate is higher when the genetic algorithm is used for adjusting the AI parameters, thereby facilitating improvement in the quality of the AI parameters.

Furthermore, this embodiment provides an encoding mode applied to the race car AI parameters. Compared with the binary encoding, in this embodiment, the race car AI parameter is encoded by using the value encoding mode, and the probability of generating an invalid parameter combination during subsequent crossover and mutation can be reduced, to further improve the convergence rate of the genetic algorithm.

In this embodiment, the selection manner of the parent AI parameters is optimized, and the selection probability of each set of AI parameters is determined based on the adaptation degree differences between the adaptation degrees of the AI parameters and the preset adaptation degree. Compared with determining the selection probability of the AI parameters according to the adaptation degree of the AI parameters directly, the selection probability of the AI parameters with the low adaptation degree can be reduced, and the selection probability of the AI parameters with the high adaptation degree can be increased, so that the probability of passing the excellent genes on to the child AI parameter is increased, thereby improving the convergence rate of the genetic algorithm and accelerating the configuration speed of the AI parameters.

In addition, in this embodiment, when the mutation operation is performed on the AI parameters, the AI parameter configuration device controls the mutation amount of the parameters, to ensure that the mutation amount of the parameter values after the mutation operation is within the preset mutation amount range, so as to prevent the invalid parameters from being generated by the blind mutation operation, to further improve the convergence rate.

In this embodiment, only the related code modules of the race car AI model are invoked, and a plurality of race car AI models are controlled simultaneously in a parallel manner to undergo the adaptation degree test, so that the time consumed for the adaptation degree test is further compressed, thereby facilitating improvement in the configuration speed of the AI parameter.

In this embodiment, the optimal AI parameter is passed on to the next generation directly by the AI parameter configuration device through the elitism, so that the convergence rate of the iteration is improved; moreover, the AI parameter configuration device determines whether the iteration falls into the local optimal solution by calculating the rise amplitudes of the adaptation degrees, and separates the iteration from the local optimal solution through the catastrophe handling in a case that the iteration falls into the local optimal solution, so that the global optimal solution is achieved, thereby further improving the convergence rate of the iteration.

When the apparatus provided in the foregoing embodiments implements functions of the apparatus, it is illustrated with an example of division of each function module. In the practical application, the function distribution may be finished by different function modules according to the requirements, that is, divide the internal structure of the device into different function modules, so as to finish all or part of the functions described above. In addition, the apparatus and method embodiments provided in the foregoing embodiments belong to one conception. For the specific implementation process, reference may be made to the method embodiments, and details are not described herein again.

An embodiment of this application further provides an AI parameter configuration device, the device including a processor and a memory, the memory storing at least one instruction, at least one section of program, a code set, or an instruction set, and the at least one instruction, the at least one section of program, the code set, or the instruction set being loaded and executed by the processor to implement the AI parameter configuration method for a racing AI model according to the foregoing embodiments.

Figure 16:
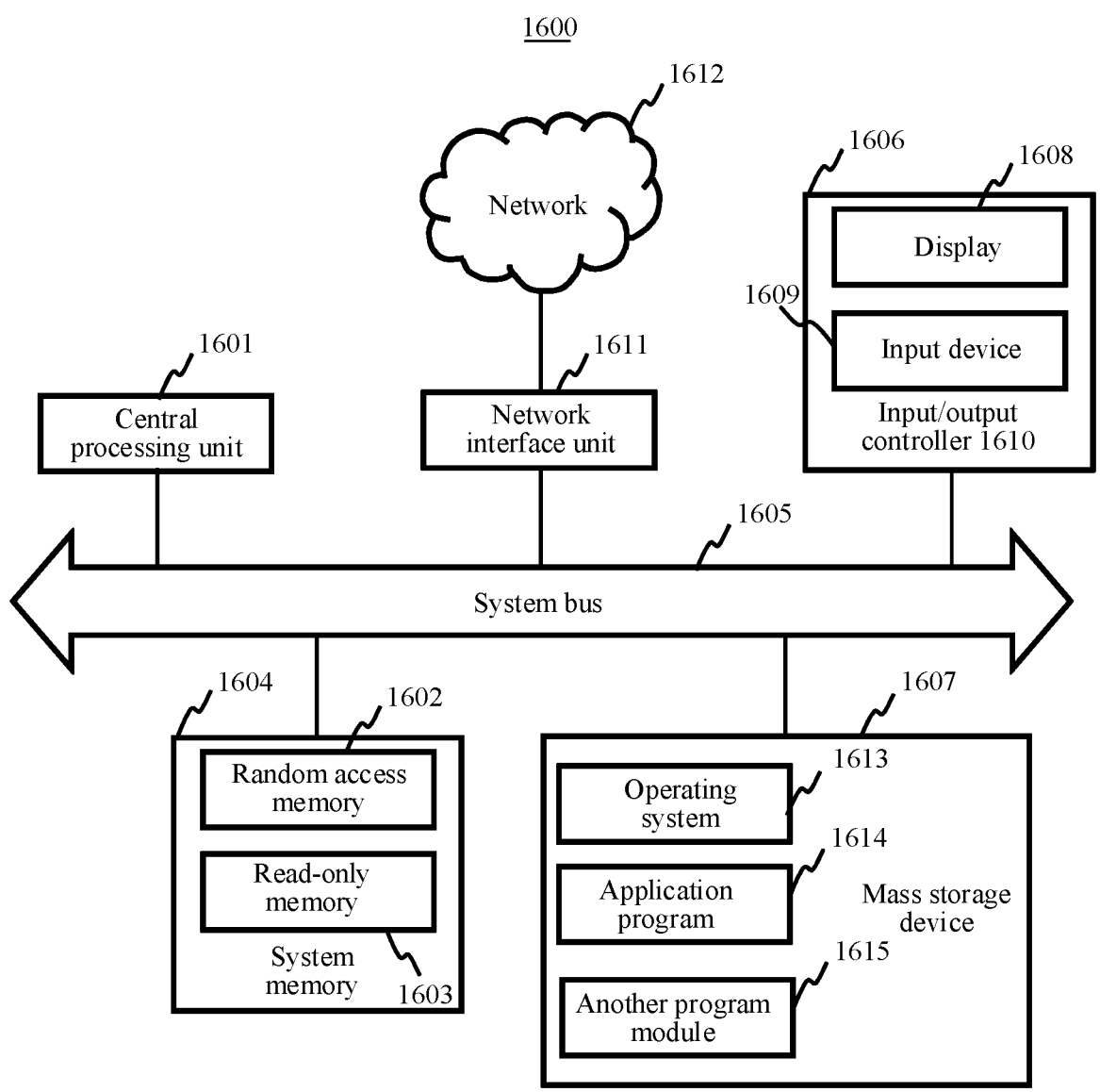
FIG. 16 is a schematic structural diagram of an AI parameter configuration device according to an embodiment of this application.

FIG. 16 is a schematic structural diagram of an AI parameter configuration device according to an embodiment of this application. The device is configured to implement the AI parameter configuration method provided in the foregoing embodiments.

The device 1600 includes a central processing unit (CPU) 1601 (e.g., processing circuitry), a system memory 1604 including a random access memory (RAM) 1602 and a read-only memory (ROM) 1603, and a system bus 1605 connecting the system memory 1604 and the CPU 1601. The device 1600 further includes a basic input/output system (I/O system) 1606 configured to transmit information between components in a computer, and a mass storage device 1607 configured to store an operating system 1613, an application program 1614, and another program module 1615.

The basic I/O system 1606 includes a display 1608 configured to display information, and an input device 1609 used by a user to input information, such as a mouse or a keyboard. The display 1608 and the input device 1609 are both connected to the CPU 1601 by using an input/output controller 1610 connected to the system bus 1605. The basic I/O system 1606 may further include the input/output controller 1610, to receive and process inputs from multiple other devices, such as the keyboard, the mouse, or an electronic stylus. Similarly, the input/output controller 1610 further provides an output to a display screen, a printer, or another type of output device.

The mass storage device 1607 is connected to the CPU 1601 by using a mass storage controller (not shown) connected to the system bus 1605. The mass storage device 1607 and an associated computer readable medium provide non-volatile storage for the device 1600. That is, the mass storage device 1607 may include a computer readable medium (not shown), such as a hard disk or a CD-ROM drive.

Without loss of generality, the computer readable medium may include a computer storage medium (e.g., a non-transitory computer-readable storage medium) and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an EPROM, an EEPROM, a flash memory, or other solid storage technologies; a CD-ROM, a DVD, or other optical storages; and a cassette, a magnetic tape, a disk storage, or other magnetic storage devices. Certainly, a person skilled in the art may know that the computer storage medium is not limited to the foregoing types. The system memory 1604 and the mass storage device 1607 may be collectively referred to as a memory.

According to the embodiments of this application, the device 1600 may be further connected, through a network such as the Internet, to a remote computer on the network and run. That is, the device 1600 may be connected to a network 1612 by using a network interface unit 1611 (e.g., interface circuitry) connected to the system bus 1605, or may be connected to another type of network or a remote computer system by using the network interface unit 1611.

The memory stores at least one instruction, at least one section of program, a code set, or an instruction set, and the at least one instruction, the at least one section of program, the code set, or the instruction set is configured to be executed by one or more processors to implement functions in steps of the foregoing AI parameter configuration method.

A computer-readable storage medium (e.g., a non-transitory computer-readable storage medium) is further provided in the embodiments of this application, the storage medium storing at least one instruction, at least one section of program, a code set, or an instruction set, and the at least one instruction, the at least one section of program, the code set, or the instruction set being loaded and executed by a processor to implement the AI parameter configuration method provided in the foregoing embodiments.

Optionally, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this application are merely for the convenience of description, and do not imply the preference among the embodiments.

What is claimed is:

1. An artificial intelligence (AI) parameter configuration method for a racing AI model performed by an AI parameter configuration device, the method comprising:

obtaining, by processing circuitry of the AI parameter configuration device, a first parameter set including m sets of AI parameters, each of the m sets of AI parameters being used by the racing AI model to travel on a track;

controlling, by the processing circuitry, the racing AI model to undergo an adaptation degree test according to each of the m sets of AI parameters to obtain m adaptation degrees, the m adaptation degrees being positively correlated with travel distances of the racing AI model on the track according to the m sets of AI parameters;

comparing the m adaptation degrees to an adaptation degree threshold;

generating, by the processing circuitry, a second parameter set according to the first parameter set in a case that the comparison indicates all the m adaptation degrees are less than the adaptation degree threshold; and configuring, by the processing circuitry and in a case that the comparison indicates a target adaptation degree in the m adaptation degrees is greater than the adaptation degree threshold, an AI parameter corresponding to the target adaptation degree as a target AI parameter.

2. The AI parameter configuration method according to claim 1, wherein the generating of the second parameter set comprises:

selecting two sets of parent AI parameters from the m sets of AI parameters included in the first parameter set according to the m adaptation degrees;

performing crossover and mutation on the two sets of parent AI parameters to obtain two sets of child AI parameters; and adding the two sets of child AI parameters to the second parameter set.

3. The AI parameter configuration method according to claim 2, wherein the selecting two sets of parent AI parameters comprises:

calculating adaptation degree differences between the m adaptation degrees and a preset adaptation degree, the preset adaptation degree being less than or equal to a minimum adaptation degree in the m adaptation degrees;

determining selection probabilities of the AI parameters corresponding to adaptation degrees in the m adaptation degrees according to the adaptation degree differences, the selection probabilities and the adaptation degree differences being positively correlated; and selecting the two sets of parent AI parameters from the m sets of AI parameters according to the selection probabilities.

4. The AI parameter configuration method according to claim 2, wherein the performing the crossover and the mutation on the two sets of parent AI parameters comprises:

performing a crossover operation on parameter values in the two sets of parent AI parameters in one of a single-point crossover manner and a two-point crossover manner; and performing, according to a preset mutation probability, a mutation operation on the parameter values in the two sets of parent AI parameters after the crossover operation to obtain the two sets of child AI parameters, a mutation amount of the parameter values after the mutation operation being within a preset mutation amount range.

5. The AI parameter configuration method according to claim 2, wherein the generating of the second parameter set further comprises:

sorting the m adaptation degrees in descending order; and adding k sets of the m sets of AI parameters corresponding to first k sorted adaptation degrees to the second parameter set, $1 \leq k < m$, and k being an integer.

6. The AI parameter configuration method according to claim 2, wherein before the generating of the second parameter set, the method further comprises:

obtaining maximum adaptation degrees of a plurality of parameter sets for each predetermined number of parameter sets;

detecting whether rise amplitudes of the maximum adaptation degrees are less than an amplitude threshold; and performing catastrophe handling on the first parameter set in a case that the rise amplitudes are less than the amplitude threshold, wherein the generating the second parameter set includes generating the second parameter set according to the first parameter set after the catastrophe handling.

7. The AI parameter configuration method according to claim 6, wherein the performing the catastrophe handling comprises:

sorting the m adaptation degrees in descending order; and deleting j sets of AI parameters corresponding to first j sorted adaptation degrees, $1 \leq j < m$, and j being an integer.

8. The AI parameter configuration method according to claim 6, wherein the performing the catastrophe handling comprises:

raising a mutation probability of each of the m sets of AI parameters in the first parameter set by a predetermined value, a probability that parameter mutation occurs being increased in a case of generating the second parameter set according to the first parameter set after the mutation probability is raised.

9. The AI parameter configuration method according to claim 1, wherein the controlling the racing AI model comprises:

invoking related code modules of the racing AI model, the related code modules including at least an AI code module, a race car code module, or a physical code module, the AI code module being configured to control the racing AI model to travel on the track according to the m sets of AI parameters, the race car code module being configured to update a position of the racing AI model on the track, and the physical code module being configured to process a collision between the racing AI model and the track;

inputting the m sets of AI parameters into the related code modules;

controlling m racing AI models in parallel to undergo an adaptation degree test for a predetermined duration, a collision mechanism between the m racing AI models being turned off during the adaptation degree test; and determining the m adaptation degrees according to the travel distances of the m racing AI models on the track.

10. The AI parameter configuration method according to claim 1, wherein the racing AI model is a race car AI model.

11. An artificial intelligence (AI) parameter configuration apparatus for a racing AI model, the apparatus comprising:

processing circuitry configured to obtain a first parameter set including m sets of AI parameters, each of the m sets of AI parameters being used by the racing AI model to travel on a track;

control the racing AI model to undergo an adaptation degree test according to each of the m sets of AI parameters to obtain m adaptation degrees, the m adaptation degrees being positively correlated with travel distances of the racing AI model on the track according to the m sets of AI parameters;

compare the m adaptation degrees to an adaptation degree threshold;

generate a second parameter set according to the first parameter set in a case that the comparison indicates all the m adaptation degrees are less than the adaptation degree threshold; and configure, in a case that the comparison indicates a target adaptation degree in the m adaptation degrees is greater than the adaptation degree threshold, an AI parameter corresponding to the target adaptation degree as a target AI parameter.

12. The AI parameter configuration apparatus according to claim 11, wherein the processing circuitry is configured to select two sets of parent AI parameters from the m sets of AI parameters included in the first parameter set according to the m adaptation degrees;

perform crossover and mutation on the two sets of parent AI parameters to obtain two sets of child AI parameters; and add the two sets of child AI parameters to the second parameter set.

13. The AI parameter configuration apparatus according to claim 12, wherein the processing circuitry is configured to calculate adaptation degree differences between the m adaptation degrees and a preset adaptation degree, the preset adaptation degree being less than or equal to a minimum adaptation degree in the m adaptation degrees;

determine selection probabilities of the AI parameters corresponding to adaptation degrees in the m adaptation degrees according to the adaptation degree differences, the selection probabilities and the adaptation degree differences being positively correlated; and select the two sets of parent AI parameters from the m sets of AI parameters according to the selection probabilities.

14. The AI parameter configuration apparatus according to claim 12, wherein the processing circuitry is configured to perform a crossover operation on parameter values in the two sets of parent AI parameters in one of a single-point crossover manner and a two-point crossover manner; and perform, according to a preset mutation probability, a mutation operation on the parameter values in the two sets of parent AI parameters after the crossover operation to obtain the two sets of child AI parameters, a mutation amount of the parameter values after the mutation operation being within a preset mutation amount range.

15. The AI parameter configuration apparatus according to claim 12, wherein the processing circuitry is configured to sort the m adaptation degrees in descending order; and add k sets of the m sets of AI parameters corresponding to first k sorted adaptation degrees to the second parameter set, $1 \leq k < m$, and k being an integer.

16. The AI parameter configuration apparatus according to claim 12, wherein the processing circuitry is configured to before the second parameter set is generated, obtain maximum adaptation degrees of a plurality of parameter sets for each predetermined number of parameter sets;

detect whether rise amplitudes of the maximum adaptation degrees are less than an amplitude threshold; and perform catastrophe handling on the first parameter set in a case that the rise amplitudes are less than the amplitude threshold, and generate the second parameter set according to the first parameter set after the catastrophe handling.

17. The AI parameter configuration apparatus according to claim 16, wherein the processing circuitry is configured to sort the m adaptation degrees in descending order; and delete j sets of AI parameters corresponding to first j sorted adaptation degrees, $1 \leq j < m$, and j being an integer.

18. The AI parameter configuration apparatus according to claim 16, wherein the processing circuitry is configured to raise a mutation probability of each of the m sets of AI parameters in the first parameter set by a predetermined value, a probability that parameter mutation occurs being increased in a case of generating the second parameter set according to the first parameter set after the mutation probability is raised.

19. The AI parameter configuration apparatus according to claim 11, wherein the processing circuitry is configured to invoke related code modules of the racing AI model, the related code modules including at least an AI code module, a race car code module, or a physical code module, the AI code module being configured to control the racing AI model to travel on the track according to the m sets of AI parameters, the race car code module being configured to update a position of the racing AI model on the track, and the physical code module being configured to process a collision between the racing AI model and the track;

input the m sets of AI parameters into the related code modules;

control m racing AI models in parallel to undergo an adaptation degree test for a predetermined duration, a collision mechanism between the m racing AI models being turned off during the adaptation degree test; and determine the m adaptation degrees according to the travel distances of the m racing AI models on the track.

20. A non-transitory computer-readable storage medium storing instructions which when executed by a processor cause the processor to perform an artificial intelligence (AI) parameter configuration method for a racing AI model, the method comprising:

obtaining a first parameter set including m sets of AI parameters, each of the m sets of AI parameters being used by the racing AI model to travel on a track;

controlling the racing AI model to undergo an adaptation degree test according to each of the m sets of AI parameters to obtain m adaptation degrees, the m adaptation degrees being positively correlated with travel distances of the racing AI model on the track according to the m sets of AI parameters;

comparing the m adaptation degrees to an adaptation degree threshold;

generating a second parameter set according to the first parameter set in a case that the comparison indicates all the m adaptation degrees are less than the adaptation degree threshold; and configuring, in a case that the comparison indicates a target adaptation degree in the m adaptation degrees is greater than the adaptation degree threshold, an AI parameter corresponding to the target adaptation degree as a target AI parameter.

* * * * *